US008665898B2

(12) United States Patent
Spinar et al.

(10) Patent No.: US 8,665,898 B2
(45) Date of Patent: Mar. 4, 2014

(54) METHOD AND SYSTEM FOR ADAPTIVELY OBTAINING BANDWIDTH ALLOCATION REQUESTS

(75) Inventors: Brian Spinar, San Diego, CA (US); Kenneth L. Stanwood, Cardiff by the Sea, CA (US)

(73) Assignee: Wi-Lan, Inc., Ottawa (CA)

( * ) Notice: Subject to any disclaimer, the term of this patent is extended or adjusted under 35 U.S.C. 154(b) by 280 days.

(21) Appl. No.: 12/695,984

(22) Filed: Jan. 28, 2010

(65) Prior Publication Data

US 2010/0157928 A1 Jun. 24, 2010

Related U.S. Application Data

(63) Continuation of application No. 11/350,474, filed on Feb. 8, 2006, now Pat. No. 7,751,437, and a continuation of application No. 10/014,951, filed on Dec. 11, 2001, now Pat. No. 7,006,530.

(60) Provisional application No. 60/257,525, filed on Dec. 22, 2000.

(51) Int. Cl.
*H04L 12/42* (2006.01)

(52) U.S. Cl.
USPC .......................................... 370/449; 370/468

(58) Field of Classification Search
None
See application file for complete search history.

(56) References Cited

U.S. PATENT DOCUMENTS

| | | | |
|---|---|---|---|
| 3,949,404 | A | 4/1976 | Fletcher et al. |
| 4,464,767 | A | 8/1984 | Bremer |
| 4,495,619 | A | 1/1985 | Acampora |
| 4,924,461 | A | 5/1990 | Amemiya et al. |
| 5,130,983 | A | 7/1992 | Heffner, III |
| 5,297,144 | A | 3/1994 | Gilbert et al. |
| 5,349,342 | A | 9/1994 | Nilles et al. |
| 5,349,580 | A | 9/1994 | Hester et al. |

(Continued)

FOREIGN PATENT DOCUMENTS

| | | |
|---|---|---|
| EP | 0353759 | 2/1992 |
| EP | 0507384 | 10/1992 |

(Continued)

OTHER PUBLICATIONS

"Asynchronous Transfer Mode (ATM) Technical Overview", 2nd Edition, Prentice Hall, Oct. 1995, Chapter 3, pp. 21-25.

(Continued)

*Primary Examiner* — Robert W Wilson
(74) *Attorney, Agent, or Firm* — Procopio, Cory, Hargreaves & Savitch LLP

(57) ABSTRACT

A method and apparatus for adaptively obtaining bandwidth requests in a broadband wireless communication system. The method and apparatus includes dynamically varying technique combinations enabling a plurality of users to efficiently request bandwidth from a shared base station. A user may "piggyback" a new bandwidth request upon, or set a "poll-me bit" within, presently allocated bandwidth. A base station may poll users, individually or in groups, by allocating unrequested bandwidth for new requests. Polling may respond to a "poll-me bit," and/or it may be adaptively periodic at a rate based on communication status parameters, such as recent communication activity and connection QoS levels. Group polling permits a possibility of collisions. Polling policies may be established for dynamically varying user groups, or may be determined for each user. Dynamic selection of appropriate polling techniques makes use of efficiency benefits associated with each technique.

20 Claims, 16 Drawing Sheets

(56) References Cited

U.S. PATENT DOCUMENTS

| | | |
|---|---|---|
| 5,404,374 A | 4/1995 | Mullins et al. |
| 5,412,651 A | 5/1995 | Gorshe |
| 5,420,851 A | 5/1995 | Seshadri et al. |
| 5,444,698 A | 8/1995 | Kito |
| 5,479,447 A | 12/1995 | Chow et al. |
| 5,506,848 A | 4/1996 | Drakopoulos et al. |
| 5,511,082 A | 4/1996 | How et al. |
| 5,517,503 A | 5/1996 | Hess |
| 5,570,355 A | 10/1996 | Dail et al. |
| 5,592,470 A | 1/1997 | Rudrapatna et al. |
| 5,594,720 A | 1/1997 | Papadopoulos et al. |
| 5,594,738 A | 1/1997 | Crisler et al. |
| 5,596,576 A | 1/1997 | Milito et al. |
| 5,596,577 A | 1/1997 | Perreault et al. |
| 5,615,212 A | 3/1997 | Ruszczyk et al. |
| 5,634,006 A | 5/1997 | Baugher et al. |
| 5,638,371 A | 6/1997 | Raychaudhuri et al. |
| 5,638,374 A | 6/1997 | Heath |
| 5,640,395 A | 6/1997 | Hamalainen et al. |
| 5,644,576 A | 7/1997 | Bauchot et al. |
| 5,673,031 A | 9/1997 | Meier |
| 5,675,573 A | 10/1997 | Karol et al. |
| 5,677,909 A | 10/1997 | Heide |
| 5,710,762 A | 1/1998 | Petranovich |
| 5,729,531 A | 3/1998 | Raith et al. |
| 5,732,078 A | 3/1998 | Arango et al. |
| 5,751,708 A | 5/1998 | Eng et al. |
| 5,768,254 A | 6/1998 | Papadopoulos et al. |
| 5,787,080 A | 7/1998 | Hulyalkar et al. |
| 5,818,820 A | 10/1998 | Anderson et al. |
| 5,818,828 A | 10/1998 | Packer et al. |
| 5,818,845 A | 10/1998 | Moura et al. |
| 5,828,695 A | 10/1998 | Webb |
| 5,859,619 A | 1/1999 | Wu et al. |
| 5,886,989 A | 3/1999 | Evans et al. |
| 5,886,995 A | 3/1999 | Arsenault et al. |
| 5,889,963 A | 3/1999 | Gopal et al. |
| 5,890,055 A | 3/1999 | Chu et al. |
| 5,896,561 A | 4/1999 | Schrader et al. |
| 5,898,925 A | 4/1999 | Honkasalo et al. |
| 5,917,822 A | 6/1999 | Lyles et al. |
| 5,926,476 A | 7/1999 | Ghaibeh |
| 5,946,322 A | 8/1999 | Moura et al. |
| 5,953,344 A | 9/1999 | Dail et al. |
| 5,956,330 A | 9/1999 | Kerns |
| 5,956,338 A | 9/1999 | Ghaibeh |
| 5,956,642 A | 9/1999 | Larsson et al. |
| 5,991,287 A | 11/1999 | Diepstraten et al. |
| 6,005,853 A | 12/1999 | Wang et al. |
| 6,005,857 A | 12/1999 | Honkasalo et al. |
| 6,006,069 A | 12/1999 | Langston |
| 6,016,311 A | 1/2000 | Gilbert et al. |
| 6,016,313 A | 1/2000 | Foster, Jr. et al. |
| 6,023,458 A | 2/2000 | Tweedy et al. |
| 6,031,827 A | 2/2000 | Rikkinen et al. |
| 6,031,845 A | 2/2000 | Walding et al. |
| 6,038,223 A | 3/2000 | Hansson et al. |
| 6,038,455 A | 3/2000 | Gardner et al. |
| 6,047,189 A | 4/2000 | Yun et al. |
| 6,049,549 A | 4/2000 | Ganz et al. |
| 6,049,551 A | 4/2000 | Hinderks et al. |
| 6,052,594 A | 4/2000 | Chuang et al. |
| 6,061,330 A | 5/2000 | Johansson |
| 6,075,787 A | 6/2000 | Bobeck et al. |
| 6,094,421 A | 7/2000 | Scott |
| 6,097,733 A | 8/2000 | Basu et al. |
| 6,104,700 A | 8/2000 | Haddock et al. |
| 6,108,316 A | 8/2000 | Agrawal et al. |
| 6,112,080 A | 8/2000 | Anderson et al. |
| 6,114,968 A | 9/2000 | Ramakrishnan et al. |
| 6,115,390 A | 9/2000 | Chuah |
| 6,137,787 A | 10/2000 | Chawla et al. |
| 6,141,336 A | 10/2000 | Bauchot et al. |
| 6,141,534 A | 10/2000 | Snell et al. |
| 6,151,312 A | 11/2000 | Evans et al. |
| 6,198,728 B1 | 3/2001 | Hulyalkar et al. |
| 6,212,196 B1 | 4/2001 | Momona |
| 6,212,200 B1 | 4/2001 | Iizuka et al. |
| 6,216,006 B1 | 4/2001 | Scholefield et al. |
| 6,222,832 B1 | 4/2001 | Proctor |
| 6,249,526 B1 | 6/2001 | Loukianov |
| 6,262,980 B1 | 7/2001 | Leung et al. |
| 6,275,497 B1 | 8/2001 | Varma et al. |
| 6,282,187 B1 | 8/2001 | Evans et al. |
| 6,295,285 B1 | 9/2001 | Whitehead |
| 6,298,049 B1 | 10/2001 | Vanhoof et al. |
| 6,314,110 B1 | 11/2001 | Chin et al. |
| 6,324,184 B1 | 11/2001 | Hou et al. |
| 6,337,849 B1 | 1/2002 | Smith et al. |
| 6,359,863 B1 | 3/2002 | Varma et al. |
| 6,366,761 B1 | 4/2002 | Montpetit |
| 6,370,153 B1 | 4/2002 | Eng et al. |
| 6,373,830 B1 | 4/2002 | Ozluturk |
| 6,374,112 B1 | 4/2002 | Widegren et al. |
| 6,381,228 B1 | 4/2002 | Prieto, Jr. et al. |
| 6,388,999 B1 | 5/2002 | Gorusch et al. |
| 6,400,684 B1 | 6/2002 | Benmohamed et al. |
| 6,408,005 B1 | 6/2002 | Fan et al. |
| 6,424,656 B1 | 7/2002 | Hoebeke |
| 6,434,164 B1 | 8/2002 | Matsunaga et al. |
| 6,438,141 B1 | 8/2002 | Hanko et al. |
| 6,452,933 B1 | 9/2002 | Duffield et al. |
| 6,469,991 B1 | 10/2002 | Chuah |
| 6,470,016 B1 | 10/2002 | Kalkunte et al. |
| 6,501,745 B1 | 12/2002 | Turina et al. |
| 6,546,017 B1 | 4/2003 | Khaunte |
| 6,567,386 B1 | 5/2003 | Sugaya et al. |
| 6,567,416 B1 | 5/2003 | Chuah |
| 6,571,101 B1 | 5/2003 | Schulz |
| 6,594,246 B1 | 7/2003 | Jorgensen |
| 6,603,738 B1 | 8/2003 | Kari et al. |
| 6,615,039 B1 | 9/2003 | Eldering |
| 6,621,812 B1 | 9/2003 | Chapman et al. |
| 6,628,668 B1 | 9/2003 | Hutzli |
| 6,636,485 B1 | 10/2003 | Fijolek et al. |
| 6,650,624 B1 | 11/2003 | Quigley et al. |
| 6,658,010 B1 | 12/2003 | Enns et al. |
| 6,665,264 B1 | 12/2003 | Davison et al. |
| 6,678,282 B2 | 1/2004 | Sharper et al. |
| 6,683,866 B1 | 1/2004 | Stanwood et al. |
| 6,693,891 B1 | 2/2004 | Sugita et al. |
| 6,693,892 B1 | 2/2004 | Rinne et al. |
| 6,704,932 B1 | 3/2004 | Matsunaga et al. |
| 6,731,600 B1 | 5/2004 | Patel et al. |
| 6,741,614 B1 | 5/2004 | Porter et al. |
| 6,754,196 B1 | 6/2004 | Daane et al. |
| 6,771,648 B1 | 8/2004 | Kim et al. |
| 6,771,962 B2 | 8/2004 | Saifullah et al. |
| 6,785,252 B1 | 8/2004 | Zimmerman et al. |
| 6,791,998 B1 | 9/2004 | Yoshihara et al. |
| 6,795,409 B1 | 9/2004 | Youssefmir et al. |
| 6,829,482 B2 | 12/2004 | Rune et al. |
| 6,842,437 B1 | 1/2005 | Heath |
| 6,862,622 B2 | 3/2005 | Jorgensen |
| 6,895,248 B1 | 5/2005 | Akyol et al. |
| 6,914,890 B1 | 7/2005 | Tobita et al. |
| 6,925,068 B1 | 8/2005 | Stanwood et al. |
| 6,937,566 B1 | 8/2005 | Forslow |
| 6,940,874 B2 | 9/2005 | Ruszczyk et al. |
| 6,944,148 B1 | 9/2005 | Gehring et al. |
| 6,956,834 B2 | 10/2005 | Stanwood et al. |
| 6,970,422 B1 | 11/2005 | Ho et al. |
| 7,006,530 B2 * | 2/2006 | Spinar et al. .................. 370/468 |
| 7,047,009 B2 | 5/2006 | Laroia et al. |
| 7,050,407 B1 | 5/2006 | Frazer et al. |
| 7,103,065 B1 | 9/2006 | Quigley et al. |
| 7,116,682 B1 | 10/2006 | Waclawski |
| 7,177,323 B2 | 2/2007 | Yavatkar et al. |
| 7,333,495 B2 | 2/2008 | Sala et al. |
| 7,356,339 B2 | 4/2008 | Nam |
| 7,408,901 B1 | 8/2008 | Narayanabhatla |
| 7,418,007 B1 | 8/2008 | Liu et al. |
| 7,486,639 B2 | 2/2009 | Stanwood et al. |
| 7,512,154 B2 | 3/2009 | Quigley et al. |

(56) References Cited

U.S. PATENT DOCUMENTS

| | | | |
|---|---|---|---|
| 7,548,534 B2 | 6/2009 | Zimmerman et al. | |
| 7,562,130 B2 | 7/2009 | Dillon et al. | |
| 7,636,571 B2 | 12/2009 | Lee et al. | |
| 7,693,093 B2 | 4/2010 | Riedel et al. | |
| 7,751,437 B2* | 7/2010 | Spinar et al. | 370/468 |
| 7,783,311 B2 | 8/2010 | Takiishi et al. | |
| 7,809,373 B2 | 10/2010 | Park et al. | |
| 7,817,666 B2 | 10/2010 | Spinar et al. | |
| 7,962,139 B2 | 6/2011 | Kangude et al. | |
| 8,027,298 B2 | 9/2011 | Stanwood et al. | |
| 8,085,891 B2 | 12/2011 | Owen | |
| 8,131,295 B2 | 3/2012 | Wang et al. | |
| 8,189,514 B2 | 5/2012 | Stanwood et al. | |
| 8,243,663 B2 | 8/2012 | Spinar et al. | |
| 8,249,014 B2 | 8/2012 | Stanwood et al. | |
| 8,249,051 B2 | 8/2012 | Spinar et al. | |
| 2001/0038620 A1 | 11/2001 | Stanwood et al. | |
| 2002/0080816 A1* | 6/2002 | Spinar et al. | 370/449 |
| 2004/0213197 A1 | 10/2004 | Zimmerman et al. | |
| 2005/0047368 A1 | 3/2005 | Kotzin et al. | |
| 2005/0089064 A1 | 4/2005 | Zimmerman et al. | |
| 2005/0111409 A1 | 5/2005 | Spear et al. | |
| 2006/0002336 A1 | 1/2006 | Stanwood et al. | |
| 2008/0049678 A1 | 2/2008 | Chindapol et al. | |
| 2008/0232342 A1 | 9/2008 | Spinar et al. | |
| 2008/0232391 A1 | 9/2008 | Spinar et al. | |
| 2008/0253394 A1 | 10/2008 | Spinar et al. | |
| 2008/0268844 A1 | 10/2008 | Ma et al. | |
| 2009/0168802 A1 | 7/2009 | Spinar et al. | |
| 2009/0175235 A1 | 7/2009 | Spinar et al. | |
| 2009/0207795 A1 | 8/2009 | Spinar et al. | |
| 2010/0150093 A1 | 6/2010 | Stanwood et al. | |
| 2010/0150094 A1 | 6/2010 | Stanwood et al. | |
| 2010/0157928 A1 | 6/2010 | Spinar et al. | |
| 2011/0249585 A1 | 10/2011 | Stanwood et al. | |
| 2011/0249586 A1 | 10/2011 | Stanwood et al. | |
| 2011/0249645 A1 | 10/2011 | Spinar et al. | |
| 2011/0292904 A1 | 12/2011 | Stanwood et al. | |
| 2012/0033634 A1 | 2/2012 | Spinar et al. | |

FOREIGN PATENT DOCUMENTS

| | | |
|---|---|---|
| EP | 0622924 | 4/1994 |
| EP | 0720405 | 7/1996 |
| EP | 0845916 | 6/1998 |
| EP | 0891060 | 1/1999 |
| EP | 1045559 | 10/2000 |
| GB | 2320162 | 12/1996 |
| JP | 11122289 A | 4/1999 |
| WO | WO92/22162 | 12/1992 |
| WO | WO9810568 | 3/1998 |
| WO | 9837706 A2 | 8/1998 |
| WO | 9907170 A2 | 2/1999 |
| WO | WO99/38343 | 8/1999 |
| WO | WO99/39532 | 8/1999 |
| WO | WO00/01188 | 1/2000 |
| WO | WO0072626 | 11/2000 |
| WO | WO01/33772 | 5/2001 |

OTHER PUBLICATIONS

Conti et al., E-DCP, an extension of the distributed control-polling MAC protocol (DCP) for the Integrated services, published 1994, pp. 711-719.

Elfeitori et al., A MAC protocol for supporting real-time VBR traffic over IEEE 802.14 based HFC access networks, published May 9-12, 1999.

G. Narlikar, et al., Designing Multihop Wireless Backhand Networks with Delay Guarantees, Bell Labs, 2005, 1-4244-0222-0/06/$20.00 2006 IEEE, 12 pages.

Papadopoulos, H.C. et al., Reduction of Mixed Co-channel Interference In Microcellular STDD Systems, Vehicular Technology Conference, 1995 IEEE 45th vol. 2, pp. 759-763.

J. Pons and J. Dunlop, "Bit Error Rate Characterisation and Modelling For GSM", IEEE 1998, pp. 3722-3727.

J.B. Andersen, et al., "Prediction of Future Fading Based on Past Measurements" Vehicular Technology Conerence, VTC 99, Vol. 1, p. 151-155.

J.M. Torrance, L. Hanzo, "Upper Bound Performance of Adaptive Modulation in a Slow Rayleigh Fading Channel." IEEE Electronics Letters. vol. 32, Apr. 1996, p. 718.

Kim, et al., PRMA/DA: A New Media Access Control Protocol for Wireless ATM, IEEE, Jun. 23, 1996, pp. 240-244.

L.H. Charles Lee, Convolutional Coding, Fundamentals and Applications, Artech House, Inc., 1997, pp. 11-51.

Lin et al., "Error Control Coding, Fundamentals and Applications", Prentice-Hall Computer Applications in Electrical Erigineering Series, 1993, pp. 315-349.

Lin, Ying-Dar. On IEEE 802.14 Medium Access Control Protocol, IEEE Communications Surveys, Fourth Quarter 1998, vol, 1 No. 1, pp. 1-10.

Mollenauer, James F. et al., "An Efficient Mede Access Control Protocol for Broadband Wireless Access Systems", Submission to IEEE 802.16 Broadband Wireless Access Working Group, Oct. 28, 1999, 84 pages.

Mollenauer, James F. et al., MAC Proposal for IEEE 802.16.1), Submission to IEEE 802.16.1 Broadband Wireless Access Working Group, Dec. 24, 1999, 19 pages.

P. Bender et al., "CDMA/HDR: A Bandwidth Efficient High Speed Wireless Data Service for Nomadic Users", Communications Magazine, IEEE, vol. 38, No. 7, Jul. 2000, pp. 70-77.

P. Jain, "On the Impact of Channel and channel Quality Estimation on Adaptive Modulation" Dec. 2002, pp. 1-92.

Qiu et al., Dynamic Reservation Multiple Access (DRMA): A New Multiple Access Scheme for Personal Communication System (PCS), Wireless Networks 2 (1996), pp. 117-128, J.C. Baltzer AG, Science Publishers.

Redl et al., "An Introduction to GSM", Artech House, Inc., 1995; pp. 84, 85 and 95.

Sampei, et al., "Adaptive Modulation/TDMA Scheme for Personal Multi-Media Communication Systems", Proceedings of the Global Telecommunications Conference, U.S., New York, IEEE, Nov. 28, 1994, pp. 989-993.

Shannon, "A Mathematical Theory of Communication" Bell System Technical Journal, 379-423 (Part 1), 623-656 (part 11), Jul. 1948.

SP-RFlv.1,1-990311 (DOCSIS1.1), dated Mar. 11, 1999, http://www.cablelabs.com/specifications/SP-RFIv1.1-I01-990311.pdf, pp. 1-310.

U.S. District Court, Northern District of California, "Amended Complaint for Declaratory Judgement Demand for Jury Trial" filed Sep. 30, 2008 in Case No. 5:08-cv-4555, 20 pages.

UE, et al., "Symbol Rate and Modulation Level Controlled Adaptive Modulation/TDMA/TDD for Personal Communication Systems", Proceedings of the Vehicular Technology Conference, U.S., New York, IEEE, vol. Conf. 45, Jul. 25, 1995, pp. 306-310.

Wolf et al., "On the Weight Distribution of Linear Block Codes Formed From Convolutional Codes", IEEE, IEEE Transactions on Communications, vol. 44:9, Sep. 1996, pp. 1049-1051.

Ulm et al., "Data-Over-Cable Interface Specifications, Radio Frequency Interface Specification", Hewlett Packard Interim Specification Doc. Control No. SP-RFII01-970321, published Mar. 21, 1997 by MCNS Holdings, L.P., Section 6, pp. 43-85.

United States District Court, Southern District of Florida. *Wi-LAN USA, Inc. and Wi-LAN, Inc.*, Plaintiffs, v. *HTC Corporation, and HTC America, Inc.*, Defendants. "Complaint." Entered Dec. 6, 2012. Case No. 1:12-cv-24319-KMM. 6 pages.

United States District Court, Southern District of Florida. *Wi-LAN USA, Inc. and Wi-LAN, Inc.*, Plaintiffs, v. *Apple Inc.*, Defendant. "Complaint." Entered Dec. 6, 2012. Case No. 1:12-cv-24318-KMM. 6 pages.

United States District Court, Southern District of Florida. *Wi-LAN USA, Inc. and Wi-LAN, Inc.*, Plaintiffs, v. *Sierra Wireless America, Inc.*, Defendant. "Complaint." Entered Dec. 6, 2012. Case No. 1:12-cv-24320-KMM. 6 pages.

United States District Court, Southern District of Florida. *Wi-LAN USA, Inc. and Wi-LAN, Inc.*, Plaintiffs, v. *Telefonaktiebolaget LM*

(56) References Cited

OTHER PUBLICATIONS

*Ericsson, and Ericsson Inc.*, Defendants. "Complaint." Entered Oct. 1, 2012. Case No. 1:12-cv-23569-DMM. 7 pages.
United States District Court, Southern District of Florida. *Wi-LAN USA, Inc. and Wi-LAN, Inc.*, Plaintiffs, v. *Alcatel-Lucent USA Inc.*, Defendant. "Complaint." Entered Oct. 1, 2012. Case No. 1:12-cv-23568-CMA. 7 pages.
Bauchot et al. "MASCARA, a MAC Protocol for Wireless ATM." Nov. 1996, pp. 1-5.
Johnsson, "HiperLAN/2—The Broadband Radio Transmission Technology Operating in the 5 GHz Frequency Band." HiperLAN/2 Global Forum, 1999. pp. 1-22.
Jagannath. "An Adaptive Data Link Layer Protocol for Wireless ATM Networks." University of Mysore, India, 1994, pp. 1-81.
Kong et al. "Multi-Code DSSS MAC Protocol for Integrated Services Wireless Home Networks." IEEE Global Telecommunications Conference—Globecom'99, p. 266-270, Dec. 5-9, 1999.
Passas et al. "MAC protocol and traffic scheduling for wireless ATM networks." Mobile Networks and Applications. 3:275-292. Sep. 1, 1998, pp. 275-295.
Sau et al. "Scheduling and Quality of Service in the General Packet Radio Service." IEEE 1998 International Conference on Universal Personal Communications. p. 1067-1071. Oct. 5-8, 1998, Florence, IT.
GSM 03.60 v2.0.0 May 1997. Digital cellular telecommunication system (Phase 2+); General Packet Radio Service (GPRS); Service Description; Stage 2 (GSM 03.60 version 2.0.0), European Telecommunications Standards Institute (ETSI), pp. 1-92.
Draft TS 03 64 V2.1.1 May 1997 Technical Specification. "Digital cellular telecommunications system (Phase 2+); General Packet Radio Service (GPRS); Overall description of the GPRS Radio Interface; Stage 2 (GSM 03.64 version 2.1.1)." European Telecommunications Standards Institute (ETSI), pp. 1-52.
Draft TS 04.64 V1.0.1 May 1997. "Digital cellular telecommunications system (Phase 2+); General Packet Radio Service (GPRS); Mobile Station (MS)—Serving GPRS Support Node (SGSN); Logical Link Control (LLC) Layer (GSM 04.64 version 1.0.1)." European Telecommunications Standards Institute (ETSI), pp. 1-71.
Draft EN 301 349 V6.1.0 Aug. 1998, European Standard (Telecommunications Series). Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60 version 6.1.0 Release 1997). ETSI, pp. 1-152.

\* cited by examiner

METHOD AND SYSTEM FOR ADAPTIVELY OBTAINING BANDWIDTH ALLOCATION REQUESTS

RELATED APPLICATIONS

This application is a continuation application of Ser. No. 11/350,474, filed Feb. 8, 2006 now U.S. Pat. No. 7,751,437 and a continuation of Ser. No. 10/014,951, filed Dec. 11, 2001, now U.S. Pat. No. 7,006,530 issued Feb. 28, 2006, which claims the benefit under 35 USC §119 of U.S. provisional application No. 60/257,525, filed Dec. 22, 2000, entitled METHOD AND SYSTEM FOR ADAPTIVELY ALLOCATING BANDWIDTH IN A COMMUNICATION SYSTEM, all of which are incorporated by reference.

BACKGROUND OF THE INVENTION

1. Field of the Invention

This invention relates to wireless communication systems, and more particularly to a method and apparatus for efficiently allocating bandwidth between base stations and users in a wireless communication system.

2. Description of Related Art

Recently, wideband or "broadband" wireless communications networks have been proposed for providing delivery of enhanced services such as voice, data and video services. The broadband wireless communication system facilitates two-way communication between a base station and a plurality of fixed subscriber stations or Customer Premises Equipment (CPE) stations. One exemplary broadband wireless communication system is described in related U.S. Pat. No. 6,016,311, and shown in block diagram of FIG. 1.

As described in related U.S. Pat. No. 6,016,311, a wireless communication system facilitates two-way communication between plurality of subscriber radio stations or subscriber units (fixed or portable) and a fixed network infrastructure. Exemplary communication systems include mobile cellular telephone systems, personal communication systems (PCS), and cordless telephones. A key objective of these wireless communication systems is to provide communication channels on demand between a plurality of user units and one or more associated base stations in order to connect a subscriber or user with a network infrastructure (such as the Internet). Both wired and wireless systems, however, may have multiple access schemes which permit a particular user to obtain access to a shared communication media, such as a particular physical radio channel. Many of such shared media systems divide access between various users by allocating timeslots within a time "frame," which is used as a basic information transmission unit. Each frame is typically sub-divided into a plurality of time slots, which may be synchronous or asynchronous within the frame, some of which are used for control purposes and some for information transfer.

Bidirectional communication units typically use a "duplexing" scheme to allow information flow in both directions. Transmissions from the base station to users are commonly referred to as "downlink" transmissions. Transmissions from a user to the base station are commonly referred to as "uplink" transmissions. Time division duplexing (TDD) and frequency division duplexing (FDD) methods are examples of duplexing schemes to facilitate the exchange of information both directions between base stations and users.

As shown in FIG. 1, the exemplary broadband wireless communication system 100 includes a plurality of cells 102. Each cell 102 contains an associated cell site 104 that primarily includes a base station 106 and an active antenna array 108. Each cell 102 provides wireless connectivity between the cell's base station 106 and a plurality of customer premises equipment (CPE) 110 positioned at fixed customer sites 112 throughout the coverage area of the cell 102. The users of the system 100 may include both residential and business customers. Each cell may service several hundred or more residential and business users.

The type and quality of services available to the customers are variable and selectable. Different broadband services have different bandwidth and latency requirements, depending on the information rate and the quality of service they provide. For example, T1-type continuous bit rate (CBR) services typically require bandwidth sufficient to communicate at a well-defined data rate which has well-controlled delivery latency. Until terminated, these services generally require bandwidth allocation at a constant rate. In contrast, certain other types of data services, such as Internet protocol data services, are bursty, frequently idle (momentarily requiring zero bandwidth), and are relatively insensitive to delay variations when active.

Due to the wide variety of user service requirements, and due to the large number of users serviced by any one base station, the bandwidth allocation process in a broadband wireless communication system such as that shown in FIG. 1 can become burdensome and complex. This is especially true with regard to the allocation of uplink bandwidth. Base stations do not have a priori information regarding the bandwidth or quality of services that a selected user will require at any given time. Consequently, requests for changes to the uplink bandwidth allocation are necessarily frequent and varying. Due to this volatility in the uplink bandwidth requirements, the many CPEs serviced by a selected base station will frequently need to request bandwidth allocation. If uncontrolled, the bandwidth allocation requests will detrimentally affect system performance. The bandwidth required to accommodate user bandwidth allocation requests can become disproportionately high in comparison with the bandwidth allocated for the transmission of substantive data traffic, reducing the communication system bandwidth available to provide broadband services. This principle applies to most communications systems which share a limited communication medium among varying user connections.

Therefore, a need exists for a method and apparatus that can dynamically and efficiently allocate bandwidth in response to varying bandwidth needs in a shared media communication system. The method and apparatus should be responsive to the needs of a particular communication link. The bandwidth allocation method and apparatus should be efficient in terms of the amount of system bandwidth consumed by the actual bandwidth request and allocation process. That is, the bandwidth requests generated by the user should consume a minimum percentage of available uplink bandwidth. In addition, the bandwidth allocation method and apparatus should respond to bandwidth requests in a timely manner. Bandwidth should be allocated to high priority services in a sufficiently short time frame to maintain the quality of service specified by the user. Further, the bandwidth allocation method and apparatus should be capable of processing an arbitrarily large number of bandwidth allocation requests from a relatively large number of users. For example, in the system shown in FIG. 1, over one hundred users may be allowed to be simultaneously active, coordinating their transmissions on the uplink. The exemplary system can accommodate approximately one thousand CPEs on the physical channel.

Some prior art systems have attempted to solve bandwidth allocation requirements in a system having a shared system resource by maintaining logical queues associated with the various data sources requiring access to the shared system resource. Such a prior art system is taught by Karol et al., in U.S. Pat. No. 5,675,573, that issued on Oct. 7, 1997. More specifically, Karol et al. teach a bandwidth allocation system that allows packets or cells within traffic flows from different sources that are contending for access to a shared processing fabric to get access to that fabric in an order that is determined primarily on individual guaranteed bandwidth requirements associated with each traffic flow. In addition, the system taught by Karol et al. allow the different sources to gain access to the shared processing fabric in an order determined secondarily on overall system criteria, such as a time of arrival, or due date of packets or cells within the traffic flows. Packets or cells of data from each data source (such as a bandwidth requesting device) are queued in separate logical buffers while they await access to the processing fabric.

A need exists for efficient bandwidth allocation methods which accommodate an arbitrarily large number of users having uplink bandwidth needs which vary frequently. The inventors have recognized that in order to efficiently allocate bandwidth, it is important to determine the bandwidth needs of users in a timely, accurate and efficient manner.

SUMMARY OF THE INVENTION

In response to the above-identified need, a method and apparatus is presented herein for adaptively obtaining requests for bandwidth allocation in a shared media communication system. Adaptively obtaining bandwidth requests reduces the amount of bandwidth that is consumed for bandwidth request purposes, and provides the communication system with the information needed to efficiently allocate bandwidth for each user within the capacity limits of the system. Since some techniques for obtaining bandwidth requests require allocating bandwidth to the users for the purpose of requesting bandwidth, varying combinations of a number of bandwidth request and allocation techniques may be adaptively employed to efficiently determine and respond to changing user bandwidth needs. Each user, or group of users, is evaluated on one or more selected communications parameters, and the particular technique for obtaining bandwidth requests, or the rate of application of that technique, is selected or changed for the user or user group in response to changes in the selected communications parameters associated with the user or user group.

There are a number of techniques by which base stations can obtain bandwidth request messages from associated users. One such technique is "polling," whereby a base station polls one or more users by allocating bandwidth to the users specifically for the purpose of allowing the users to respond with a bandwidth request. Polling may be directed exclusively to a particular user (individual polling), or to a group of users (multicast or broadcast polling). Such polling of the users by the base station may be in response to a user setting a "poll-me" message, or it may be periodic without prompting from the user, or it may be performed in response to aperiodic conditions.

When an alternative means to obtain bandwidth requests is available, the bandwidth consumed for obtaining bandwidth requests may be reduced by allowing the periodic polling rate for a particular user or group to go to zero. For example, if uplink bandwidth is already allocated to a particular user or group then mechanisms such as setting a "poll-me" marker to explicitly request to be polled, or "piggybacking" bandwidth requests on existing bandwidth, may provide sufficient opportunity to request any needed bandwidth allocations. These techniques are useful for currently active users and groups, and such active users and groups may accordingly require zero periodic polling until their activity level declines.

Adaptation in obtaining bandwidth requests is performed on the basis of changing communication parameters, and may occur on different levels. First, users may be adaptively moved between different techniques for obtaining bandwidth (e.g. periodic individual polls, requested individual polls, multicast polls, and piggybacking). Second, rates of periodic individual or multicast polling, or conditions for responding to requests for polling, may be dynamically adapted for each user or group of users.

The changing communication parameters upon which adaptation is based may include parameters associated with a particular user or group, such as the quality of service (QoS) required by user connections, the rate of recent bandwidth usage associated with the user or group, and a priority contractually negotiated for the user or group. Parameters associated with the overall system may also be used, such as the amount of bandwidth available for sharing, the composite number of users and their activity levels, and the composite priority and expected quantity of other bandwidth requests.

A particular base station may be configured to treat any or all of discrete connections, groups of connections, CPEs, or other logical or physical entities, as distinct users. Each user's polling rate or technique is typically dynamically adaptive, based on one or more parameters of the user and/or of the system. Parameters may be determined and Maintained as values which are continuously variable within the quantization constraints of the constituent components of the parameters. Alternatively, parameters may be categorized, and thus determined or maintained as merely one of a finite or limited number of categorical values. These parameter values are in turn used to determine a polling rate and/or technique to apply to each user. Polling rates may themselves be determined as continuously as the values on which they are based allow, or may be further quantized into a smaller number of rate categories. Rates and techniques may be determined for each user entity, or may be determined for groups of users. Thus, the process of adaptively obtaining bandwidth requests may be based on groupings, categories and quantization of both users and of various system and user communication parameters. Such flexibility permits a wide range of different systems to employ various embodiments of the invention taught herein to improve the efficiency and effectiveness of their bandwidth allocation process.

Users may be grouped with other users in a "polling group" to which individual users are dynamically assigned based upon factors such as the physical proximity of the users to a base station, or a modulation level and forward error correction which is provided to them. Groups of individual connection users may be distinguished on the basis of factors such as the CPE through which the connection is maintained, the QoS requirements of the connections, or on load sharing considerations within a CPE or a base station.

When a user or group has low usage, sufficient bandwidth request opportunities to meet the guaranteed quality of service may in some cases be provided by periodically multicast polling the user or group, despite the statistical possibility of a collision entailed by such multicast polling. A contention resolution process is useful in conjunction with such multicast polling. The rate of multicast polling which is sufficient for a user or group depends upon the quality of service guaranteed to the user or group, in combination with the statistical probability of a collision and the time delay which would be introduced by a collision. The rate of "contention" polling may therefore be adaptively adjusted in response to changes in parameters such as the guaranteed quality of service, the number of users simultaneously polled, the history of previous use, and other factors suggesting a probability of activity.

To reduce the bandwidth absorbed by the process of obtaining bandwidth requests, the foregoing and other methods for obtaining bandwidth requests are used adaptively, dynamically changing the technique used to obtain bandwidth requests in accordance with the prevailing conditions and communication parameters for each user or group.

BRIEF DESCRIPTION OF THE DRAWINGS

Like reference numbers and designations in the various drawings indicate like elements.

DETAILED DESCRIPTION OF THE INVENTION

Throughout this description, the embodiments and examples shown should be considered as exemplars, rather than as limitations on the present invention.

A method and apparatus for adaptively obtaining bandwidth requests in a Demand Assigned Multiple Access (DAMA) communication system is described herein. One very important performance criterion of a communication system having a physical communication medium shared by a plurality of users, is how efficiently the system uses the physical medium. Since many wireless communication systems are shared-medium communication networks, access and transmission by subscribers within such networks must be controlled. In such communication systems a Media Access Control ("MAC") protocol typically controls user accesses to the physical medium. The MAC determines when subscribers are allowed to transmit on the physical medium. In addition, if contentions are permitted, the MAC controls the contention process and resolves any collisions that occur. In a Demand Access Multiple Access (DAMA) system, which grants access to a shared media on an as-requested basis, a MAC may be designed to adaptively vary the method by which requests for access, or bandwidth, are obtained so as to efficiently determine and respond to bandwidth needs to assure a requisite quality of service (QoS), without wasting bandwidth by unnecessarily polling for such requests.

Figure 1:
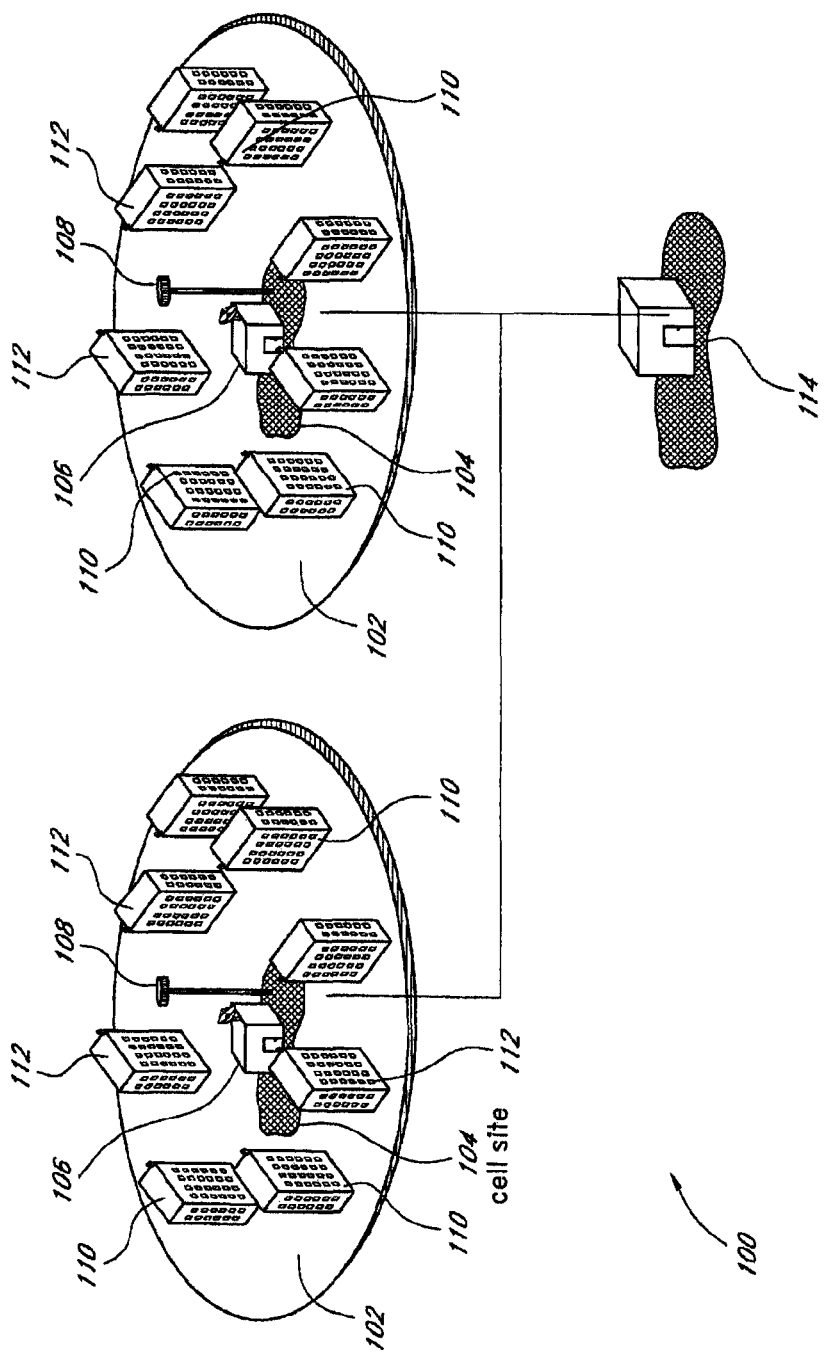
FIG. 1 shows a broadband wireless communication system.

In the exemplary system shown in FIG. 1, the MAC (executed by software and/or hardware present in the base stations 106 or in both the base stations and the CPEs 110) controls the transmission time for all of the CPEs 110. The base stations 106 receive requests for transmission rights, and may grant these requests in accordance with parameters associated with each CPE 110, such as priorities, service types, QoS, and recent usage level, and also in accordance with system parameters such as available bandwidth and competing requests for transmission rights. The services provided by the CPEs 110 may include constant bit-rate TDM information connections, such as voice trunks from a PBX, requiring a high QoS. At the other end of the service spectrum, the CPEs may communicate bursty but delay-tolerant computer data to other data devices via networks such as the Internet.

The base station MAC maps and allocates bandwidth for both the uplink and downlink communication links. These maps are developed and maintained by the base station and are referred to as the Uplink Sub-frame Maps and Downlink Sub-frame Maps. The MAC must allocate sufficient bandwidth to accommodate the bandwidth requirements imposed by high priority constant bit rate (CBR) services such as T1, E1 and similar constant bit rate services. In addition, the MAC must allocate the remaining system bandwidth across the lower priority services such as Internet Protocol (IP) data services. The MAC distributes bandwidth among these lower priority services using various techniques which may be dependent on QoS, such as fair-weighted queuing and round-robin queuing.

The downlink of the exemplary communication system shown in FIG. 1 operates on a point-to-multi-point basis (i.e., from the base station 106 to the plurality of CPEs 110). As described in U.S. Pat. No. 6,016,311, the central base station 106 includes a sectored active antenna array 108 which is capable of simultaneously transmitting to several sectors. In one embodiment of the system 100, the active antenna array 108 transmits to six independent sectors simultaneously. Within a given frequency channel and antenna sector, all stations receive the same transmission. The base station is the only transmitter operating in the downlink direction, hence it transmits without having to coordinate with other base stations. In the case of TDD, the base station must coordinate downlink transmission with uplink reception time; of course, in FDD systems this constraint does not exist, and the uplink and downlink transmissions are instead segregated by transmission carrier frequency. The base station broadcasts to all of the CPEs in a sector. The CPEs monitor the addresses in the received messages and retain only those messages addressed to them.

It will be understood by those skilled in the art, without further specific mention, that both the CPEs and the base stations may perform the tasks ascribed to them using a combination of hardware, firmware and software control. Engineering considerations drive the allocation of functions to software, firmware and/or hardware. In particular, both the CPEs and the base stations will generally employ a computer running a software program which performs the ascribed functions, or directs hardware to perform the ascribed tasks in functional modules prepared for such tasks. At least some of the physical communication must be performed in hardware, but data manipulations may be performed by a computer operation under software control, or by microprocessors operating under firmware control, or by ASICs, a portion of which is used for the specific data manipulations which are required.

The CPEs 110 share the uplink on a demand basis that is controlled by the base station MAC. Depending upon the class of service utilized by a CPE, the base station may issue continuing rights to a selected CPE to transmit on the uplink, or the right to transmit may be granted by a base station after receipt of a request from the CPE. In addition to individually addressed messages, messages may also be sent by the base station to multicast groups (control messages and video distribution are examples of multicast applications) as well as broadcast to all CPEs.

Decisions regarding bandwidth request and allocation techniques are typically made for a particular sector and channel, since this is the basic communication media which must be shared and allocated.

Frame Maps—Uplink and Downlink Sub-frame Mappings

The base stations 106 may maintain maps of the bandwidth allocated to the uplink and downlink communication links. Uplink and downlink may be duplexed in any convenient manner, such as time-division duplexing (TDD) or frequency-division duplexing (FDD). A frame may be defined as a communication media subunit, and typically has a predictable duration. It may comprise N consecutive time periods or time slots, or may be organized in sections of continuously variable length. In Adaptive Time Division Duplexing (ATDD), the communication system dynamically configures the first period, $T_1$, or the first $N_1$ time slots (where $N_1$ is less than or equal to N) for downlink transmissions only, while the remaining frame period time $T_2$ or the remaining $N_2$ time slots are dynamically configured for uplink transmissions only (where $N_2$ equals $N-N_1$). Under this ATDD frame-based scheme, the downlink sub-frame is typically transmitted first and is prefixed with information that is necessary for frame synchronization. In FDD, uplink and downlink channels on different frequencies may each be divided into N time slots to form an uplink sub-frame or a downlink sub-frame. Time division multiple access (TDMA) techniques may be used to multiplex use of the uplink and downlink channels in such a framed system, as detailed below, but the skilled person will appreciate that framing is not essential for the dynamic, adaptive techniques taught herein for allocating bandwidth and obtaining bandwidth requests. In non-framed systems one may dynamically vary (in response to varying conditions) a scheduling interval for submitting bandwidth requests.

Figure 2:
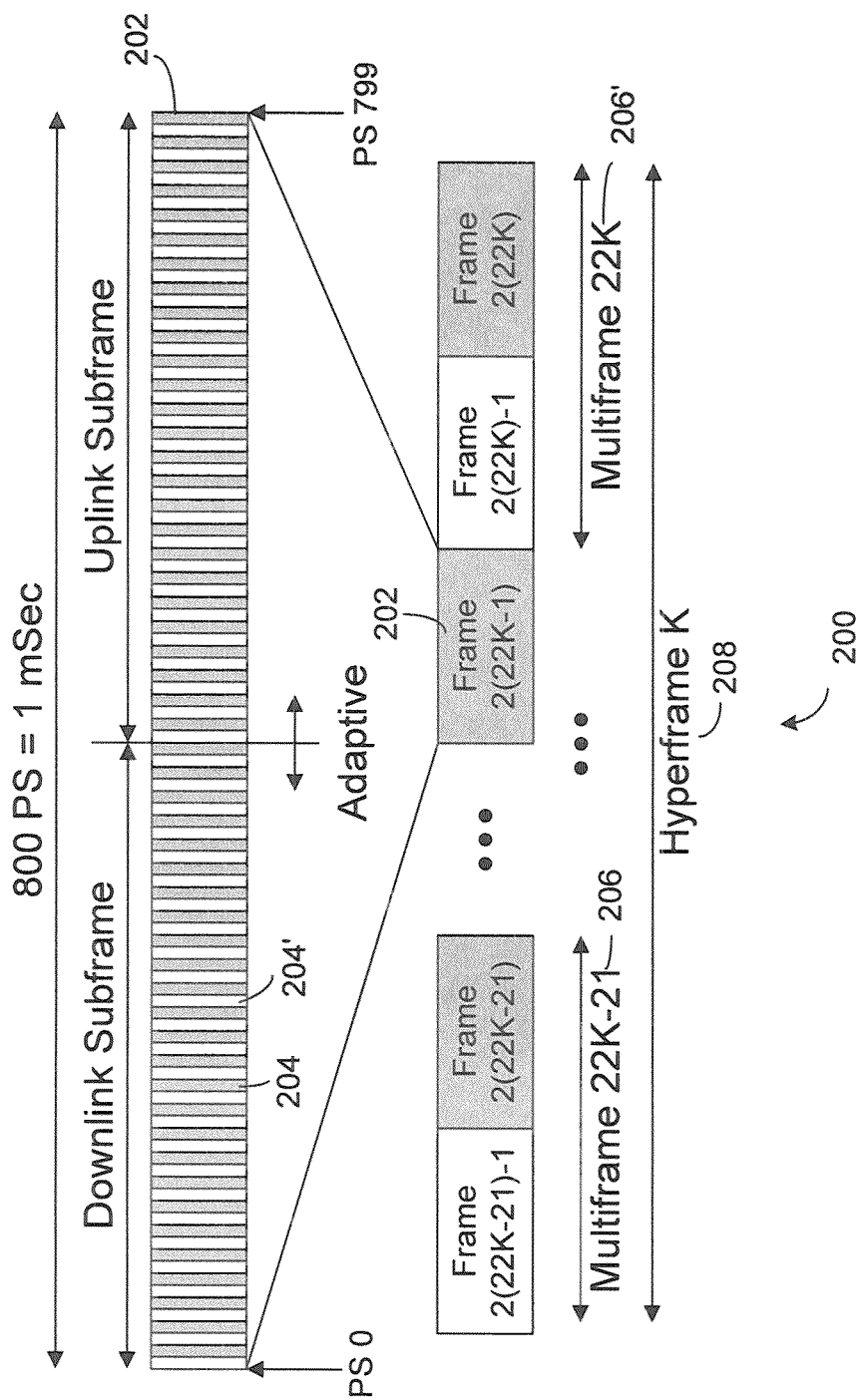
FIG. 2 shows a TDD frame and multi-frame structure that can be used by the communication system of FIG. 1.

FIG. 2 shows an ATDD frame and multi-frame structure 200 that can be used by a communication system such as that shown in FIG. 1. As shown in FIG. 2, the ATDD frame is subdivided into a plurality of physical slots (PS) 204. In the embodiment shown in FIG. 2, the frame may, for example, be one millisecond in duration and include 800 physical slots. The frame length and the number of PS in a frame are widely variable depending upon engineering considerations; the number of PS can be reduced or increased as far as the limits of system time resolution, and embodiments with no frame structure are possible, as long as a physical communication medium is shared and users are granted bandwidth on demand. In an exemplary embodiment, the available bandwidth is allocated by a base station in units of a certain pre-defined number of PSs.

Some form of digital encoding, such as the well-known Reed-Solomon encoding method, is typically performed on the digital information over a pre-defined number of bit units referred to as protocol information elements (PI). Since the data rate varies according to the modulation scheme employed, the modulation scheme controls the amount of time (i.e. number of PSs) required to transmit each PI—in an exemplary embodiment, a PI requires 6 PSs at QAM-4 modulation.

The uplink and downlink time division shown in FIG. 2 is adaptive, so that a division 210 between an uplink subframe 212 and a downlink subframe 214 moves, as indicated, toward one end or other of the frame 216 to adjust the proportions of uplink and downlink bandwidth in the frame. Thus, in a framed ATDD protocol, the number of PSs allocated to the downlink versus the uplink varies over time. As shown in FIG. 2, to aid periodic functions, multiple frames 202 are grouped into multi-frames 206, and multiple multi-frames 206 are grouped into hyper-frames 208. In one embodiment, each multi-frame 206 comprises two frames 202, and each hyper-frame comprises twenty-two multi-frames 206. Other frame, multi-frame and hyper-frame structures can be used. For example, in another embodiment, each multi-frame 206 comprises sixteen frames 202, and each hyper-frame comprises thirty-two multi-frames 206. The present method and apparatus for adaptively obtaining bandwidth requests can be used in frame and multi-frame structures similar to that shown in FIG. 2, whether ATDD or fixed TDD, and applies equally well to other framed and unframed TDMA systems, including FDD systems in which the uplink and downlink subframes do not share a hyperframe 208 with each other, but are segregated from each other on different carrier frequencies.

Figure 3:
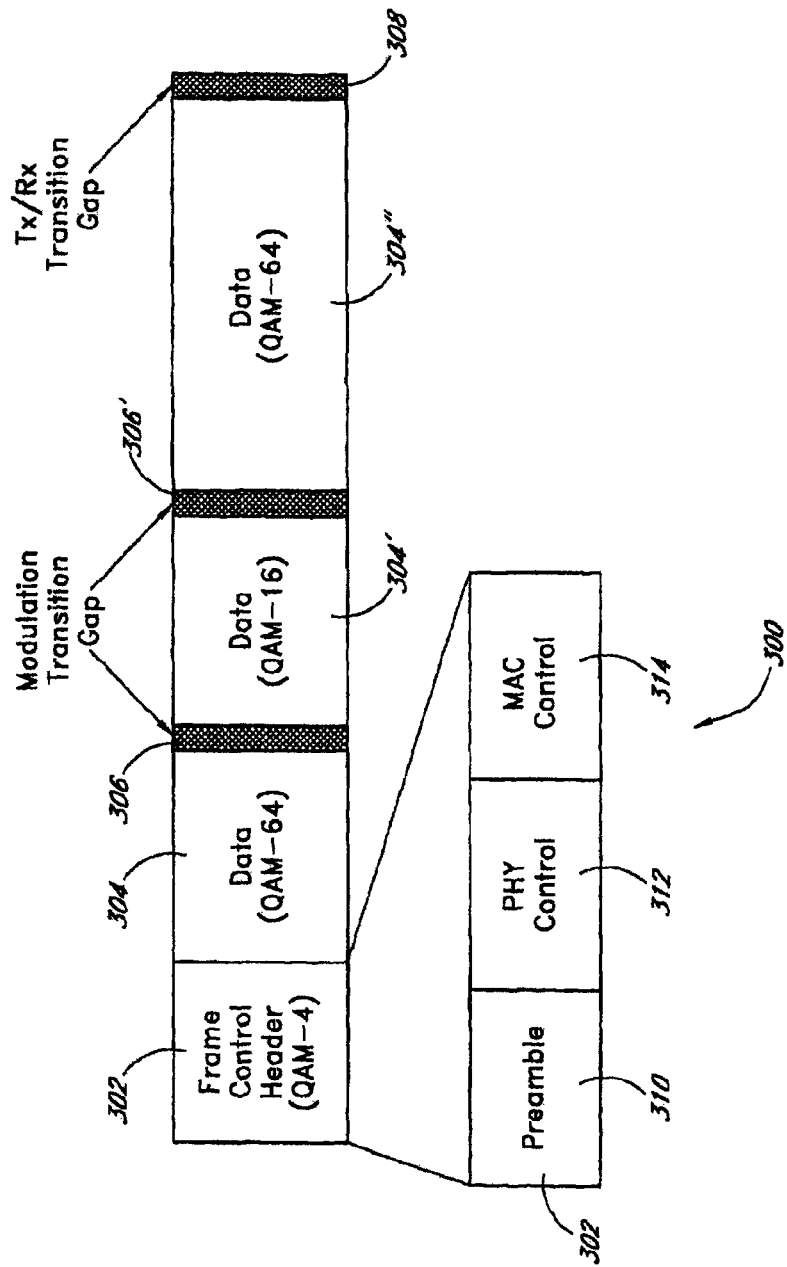
FIG. 3 shows a downlink sub-frame that can be used by a base station to transmit information to the plurality of CPEs in the wireless communication of FIG. 1.
Figure 4:
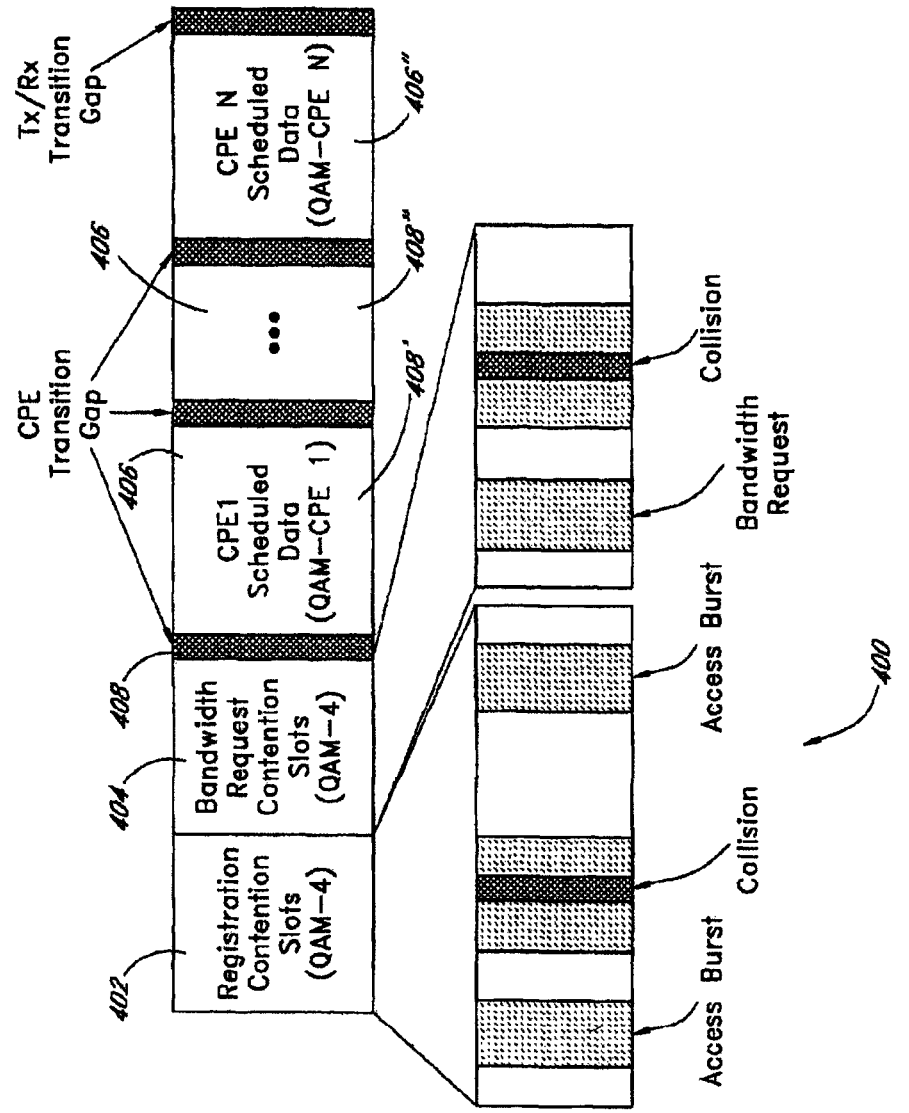
FIG. 4 shows an exemplary uplink sub-frame.

Exemplary downlink and uplink sub-frames which may be used are shown respectively in FIGS. 3 and 4. Note that these sub-frame structures are equally applicable irrespective of whether the duplexing scheme is TDD or FDD.

Downlink Sub-frame Map

FIG. 3 shows one example of a downlink sub-frame 300 that can be used by the base stations 106 to transmit information to the plurality of CPEs 110. The base station may maintain a downlink sub-frame map that reflects the downlink bandwidth allocation. The downlink sub-frame 300 may comprise a frame control header 302, a plurality of downlink data PSs 304 grouped by modulation type (e.g., PS 304 data modulated using a QAM-4 modulation scheme, PS 304' data modulated using QAM-16, etc.) and possibly separated by associated modulation transition gaps (MTGs) 306 used to separate differently modulated data, and a transmit/receive transition gap 308. In any selected downlink sub-frame any one or more of the differently modulated data blocks may be absent. Modulation transition gaps (MTGs) 306 may be 0 PS in duration. As shown in FIG. 3, the frame control header 302 contains a preamble 310 used by the physical protocol layer (or PHY) for synchronization and equalization purposes. The frame control header 302 also includes control sections for both the PHY (312) and the MAC (314).

The downlink data PSs are used for transmitting data and control messages to the CPEs 110. This data may be encoded (for example, using a Reed-Solomon encoding scheme) and transmitted at the current operating modulation used by the selected CPE. Data may be transmitted in a pre-defined modulation sequence, such as: QAM-4, followed by QAM-16, followed by QAM-64. The modulation transition gaps 306 contain preambles and are used to separate different modulations. The PHY Control portion 312 of the frame control header 302 may contain a broadcast message indicating the identity of the PS 304 at which the modulation scheme changes. Finally, as shown in FIG. 3, the Tx/Rx transition gap 308 separates the downlink sub-frame from the uplink subframe which is described in more detail below. In an FDD system the gap 308 would instead be a frame transition gap, and might be 0 PS long.

Uplink Sub-frame Map

FIG. 4 shows one example of an uplink sub-frame 400 that is adapted for use with the presently described bandwidth allocation. Here, the CPEs 110 (FIG. 1) use the uplink sub-frame 400 to transmit information (including bandwidth requests) to their associated base stations 106. As shown in FIG. 4, there are three main classes of MAC control messages that are transmitted by the CPEs 110 during the uplink frame: (1) those that are transmitted in contention slots reserved for CPE registration (Registration Contention Slots 402); (2) those that are transmitted in contention slots reserved for responses to multicast and broadcast polls for bandwidth allocation (Bandwidth Request Contention Slots 404); and those that are transmitted in bandwidth specifically allocated to individual CPEs (CPE Scheduled Data Slots 406).

The bandwidth allocated for contention slots (i.e., the contention slots 402 and 404) may be grouped together and transmitted using a pre-determined modulation scheme. For example, in the embodiment shown in FIG. 4 the contention slots 402 and 404 are transmitted using a QAM-4 modulation. The remaining bandwidth is grouped by CPE. During its scheduled bandwidth, a CPE 110 transmits with a fixed modulation that is determined by the effects of environmental factors on transmission between that CPE 110 and its associated base station 106. The downlink sub-frame 400 includes a plurality of CPE transition gaps (CTGs) 408 that serve a similar function to the modulation transition gaps (MTGs) 306 described above with reference to FIG. 3. That is, the CTGs 408 separate the transmissions from the various CPEs 110 during the uplink sub-frame. In one embodiment, the CTGs 408 are 2 physical slots in duration. A transmitting CPE may transmit a 1 PS preamble during the second PS of the CTG 408, thereby allowing the base station to synchronize to the new CPE 110. Multiple CPEs 110 may be permitted to transmit in the registration contention period simultaneously, resulting in collisions. When a collision occurs the base station may not respond.

Scheduled uplink traffic data is bandwidth allocated to specific CPEs 110 for the transmission of control messages and services data. The CPE scheduled data is ordered within the uplink sub-frame 400 based upon the modulation scheme used by the CPEs 110. In the adaptive manner described in detail below, bandwidth is requested by a CPE 110 and is subsequently granted by an associated base station 106. All of the bandwidth allocated to a selected CPE within a given uplink sub-frame is preferably grouped into a contiguous CPE scheduled data block 406. The physical slots allocated for the CTGs 408 are included in the bandwidth allocation to a selected CPE 110 in the base station uplink sub-frame map.

In addition to the bandwidth that is allocated for the transmission of the various types of broadband services (i.e., the bandwidth allocated for the CPE scheduled data slots 406), and the bandwidth allocated for CPE registration contention slots, bandwidth must also be allocated by the base station MAC for control messages such as requests for additional bandwidth allocations. As described in more detail below, CPEs 110 request changes to their bandwidth allocations by making bandwidth requests to their associated base stations 106. The present method and apparatus reduces the amount of bandwidth consumed for these bandwidth allocation requests. It is advantageous to adaptively utilize a combination of a number of techniques to tightly control the bandwidth request process.

Obtaining Requests for Bandwidth Allocation

There are a number of methods by which a CPE can transmit a bandwidth request message to its associated base station. When sufficient bandwidth is available, a CPE may transmit a bandwidth unit dedicated to requesting further bandwidth. When sufficient bandwidth for a dedicated bandwidth request is not apparently available, a bandwidth request may be "piggybacked" on existing bandwidth by commandeering all or part of the bandwidth for a request. Several methods for obtaining bandwidth requests involve a "polling" technique whereby a base station polls one or more CPEs and allocates bandwidth specifically for the purpose of allowing the CPE(s) to transmit bandwidth requests. These methods include: individual polling of a CPE by the base station in response to the CPE soliciting a poll (for example, by setting a "poll-me" message in an upstream transmission); individual polling; and "multicast" polling of groups of users. Polling individual users may be referred to as "reservation-based" polling. Individual polling may be performed "as often as possible," or may be performed periodically. Both individual and multicast polling may be periodic at intervals which may further be varied dynamically with changing conditions such as current usage level and QoS needs. Multicast polling includes the special case of broadcast polling to every CPE on a physical channel. In reservation-based polling, the base station may poll an individual CPE by allocating uplink bandwidth to allow the CPE to respond with a bandwidth request. Similarly, in multicast and broadcast polling, the base station polls several CPEs by allocating uplink bandwidth to allow the several CPEs to respond with a bandwidth request. In multicast polling, the CPEs must contend for the allocated bandwidth if collisions occur. Advantageously, neither the bandwidth polls nor the bandwidth allocations are in the form of explicit messages that are communicated by the base station to the CPEs. Rather, the bandwidth polls may comprise grants of bandwidth sufficient for transmitting bandwidth requests. Bandwidth allocation grants are implicit via the bandwidth allocations indicated in the uplink sub-frame map. The polling techniques are described in more detail below with reference to FIGS. 4-10 and 14.

As shown in FIG. 4, a portion of the uplink bandwidth may periodically be allocated for these bandwidth allocation or CPE connection requests. The uplink sub-frame 400 includes a plurality of bandwidth request contention slots 404. A CPE 110 must first be registered and achieve uplink synchronization with a base station before it is allowed to request bandwidth allocation, and there is therefore no need to allow for transmit time uncertainties in the length of the bandwidth request contention period. Consequently the bandwidth request contention period may be as small as a single PI, which, in one embodiment, at QAM-4 requires 6 PS. As with the registration requests, if a collision occurs, the base station may not respond to the CPE. If, however, the base station successfully receives a bandwidth request message from a CPE, it responds by allocating the CPE additional scheduled data 406 bandwidth in the uplink sub-frame 400. Multicast polling, in which any or all of the CPEs so polled may respond within contention slots such as contention slots 404, is an alternative to reservation-based polling which can be efficient for low-usage CPEs. The various polling techniques are described in more detail below.

A method for submitting bandwidth request messages to the base station without a need for polling is the technique of "piggybacking" bandwidth requests on bandwidth which is already allocated to a CPE. In accordance with this technique, currently active CPEs request bandwidth using previously unused portions of uplink bandwidth that is already allocated to the CPE. Alternatively, bandwidth requests are piggybacked on uplink bandwidth allocated and actively being used by a data service. In accordance with this alternative, the CPE "steals" bandwidth already allocated for a data connection by inserting bandwidth requests in time slots previously intended for data. The details of these piggybacking techniques are described in more detail below with reference to FIG. 11.

Currently active CPEs may require all of their allocated bandwidth to keep up with high-priority communications. For this situation, an alternative to piggybacking a complete bandwidth request will be useful. A place for a "poll-me" message may be reserved in a packet. Such a "poll-me" message may be a single bit, or a particular combination of bits, and may be disposed for example as part of the header of uplink packets. A CPE needing all present bandwidth may simply set the "poll-me" message in an uplink packet which is already being sent in previously allocated bandwidth. A multiple-bit "poll-me" message may use bits which convey different control messages for other purposes at other times.

The various bandwidth allocation request process techniques introduced above are described in more detail in the sub-sections that follow. All of the techniques may be used in various combinations to reduce the bandwidth consumed obtaining bandwidth allocation requests. It is advantageous to make use of the efficiency benefits associated with each bandwidth allocation request technique by dynamically adapting the technique used with each user based upon the present conditions of the user, the CPE if different from the user, and the channel generally. For example, although an individual polling technique is beneficial with regard to the ability to provide fast response times to bandwidth allocation requests, it can be relatively inefficient with regard to the amount of bandwidth consumed by the bandwidth allocation process. In contrast, the group polling method is relatively efficient with regard to the bandwidth consumed by the bandwidth allocation process for occasional bandwidth requests, but it is less efficient with regard to the ability to respond to frequent bandwidth allocation requests which cause collisions. Use of a "poll-me" bit is relatively efficient when considered from both the bandwidth consumption and response time perspectives but requires that the CPE already have uplink bandwidth allocated. Similarly, the piggybacking technique may enhance bandwidth consumption efficiency by using previously unused portions of the bandwidth to send the bandwidth allocation requests, but this technique requires existing bandwidth allocation. It is advantageous to adaptively use all of these bandwidth allocation techniques in various combinations, based on conditions such as the amount of usage by particular CPEs and their requisite QoS, in order to maximize efficiency.

Polling Techniques

In one embodiment of the broadband wireless system 100 of FIG. 1, a CPE 110 is assigned a dedicated connection identifier (ID) when the CPE 110 first registers with the system 100. The ID may be used when the base station 106 exchanges control messages with each of the plurality of CPEs 110. As described above, variations in bandwidth requirements (i.e., increases or decreases to bandwidth requirements) are necessary for all services transported by the system 100 with the exception of uncompressible constant bit rate, or continuous grant (CG) services. The bandwidth requirements of uncompressible CG services do not change between connection establishment and termination. Even the requirements of compressible CG services, such as channelized-T1 services, may increase or decrease depending on traffic. Since a particular CPE may handle a plurality of connections, some bursty and others relatively constant, its bandwidth needs will generally vary.

Many of the data services facilitated by the system 100 of FIG. 1 are bursty and delay-tolerant. Because bandwidth is provided to these services on a demand assignment basis as needed, these services are commonly referred to as Demand-Assigned Multiple Access or "DAMA" services. When a CPE 110 needs to request bandwidth for a DAMA service it transmits a bandwidth request message to the base station 106. The bandwidth request messages communicate the immediate bandwidth requirements for the DAMA service. The bandwidth requirements can and typically do vary over time. The quality of service or "QoS" for the DAMA connection may be established when the CPE connection is initially established with the base station. Therefore, the base station has the ability to access or "look-up" the QoS for any DAMA service that it is currently accommodating.

As described above, the CPEs 110 have a number of different techniques available to them for communicating bandwidth request messages to their associated base stations. One such technique is by transmitting a bandwidth request message in response to being polled by a base station. In accordance with the basic polling technique, the base station allocates bandwidth to selected CPEs specifically for the purpose of making bandwidth requests. The bandwidth for requests may be allocated to individual CPEs, or to multicast groups of CPEs. As described in more detail below in the subsection which describes the group or multicast polling technique, allocations to multicast groups of CPEs define bandwidth request contention slots, and simultaneous responses will likely collide, requiring resolution of the collisions. Advantageously, the bandwidth allocations are not made in the form of explicit messages, but rather they are made in the form of bandwidth allocation increases in the transmitted map describing the uplink sub-frame 400 (FIG. 4). In an exemplary system, polling is performed on a per-CPE basis, while bandwidth is requested by the CPE on a per-connection-ID basis, and bandwidth is allocated on a per-CPE basis. These concepts are described in more detail below.

Reservation-based Polling Technique (Individual Polling)

When a CPE (or other user entity) is polled individually, no explicit message need be transmitted to poll the selected CPE. Rather, the CPE is allocated bandwidth in the uplink sub-frame map that is sufficient to allow the CPE to respond with a bandwidth request. Specifically, the base station allocates bandwidth in the CPE scheduled data block 406 (FIG. 4) for the selected CPE that is sufficient to allow the selected CPE to respond with a bandwidth request message. If the selected CPE does not require more bandwidth, it returns a request for zero bytes. A zero byte request (rather than no request) may be used in the individual polling process because explicit bandwidth for a reply has already been allocated. Users other than CPEs, such as individual connections and connection groups, may be similarly polled by providing bandwidth to the user without an explicit message. Alternatively, in some implementations, if a CPE does not require more bandwidth, unused bandwidth resulting from the polling of the CPE may be padded with fill bytes, implying a request for zero bytes.

In some systems, even the basic communication unit allocated to a CPE or user for the purpose of requesting bandwidth can be multiplexed to include both user data and a bandwidth request. In most systems, such a basic communication unit may be defined to include at least user data and a "poll-me" request. A CPE can efficiently utilize the bandwidth allocated to it by including both user data and, if needed, a piggybacked bandwidth request or polling solicitation in the same allocated bandwidth.

Inactive users, and active users which explicitly request to be polled by setting a "poll-me" message within existing bandwidth, are eligible for individual polling. Active users that do not set a respective "poll-me" message will not generally be polled individually, since their access to existing bandwidth makes them capable of alternatives, such as either piggybacking a bandwidth request or at least setting a poll-me message. Individual polling is very useful for users which have momentarily suspended transmissions. The rate of polling may adaptively depend, for example, on the duration of the user's suspension. Users of active CPEs respond to polling using the modulation scheme currently in use. However, responses by or via inactive CPEs may use a QAM-4 or similarly robust modulation scheme to ensure that the transmission can be detected by the base station even under adverse environmental conditions.

It is desirable to ensure timely responses to requests for more bandwidth for a constant bit rate service such as a channelized T1 service in which channels may be added or dropped dynamically. To ensure that the base station responds quickly to requests for more bandwidth for a constant bit rate service, the uplink bandwidth allocated to a constant bit rate service that is not currently operating at a maximum rate may be made sufficiently large to accommodate both the service's current rate and a bandwidth request.

Figure 5:
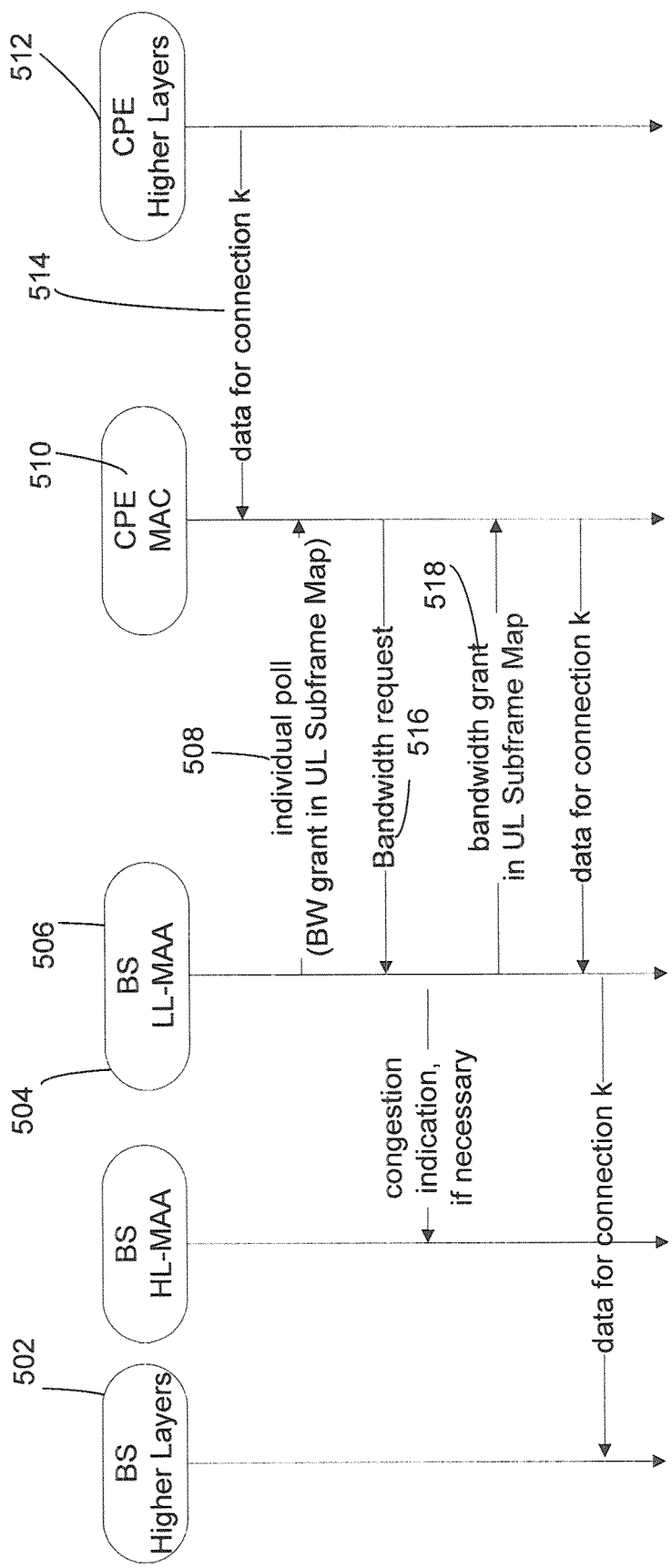
FIG. 5 is a flow diagram showing the information exchange sequence used in practicing some individual polling techniques.

The information exchange sequence for individual polling is shown in the flow diagram of FIG. 5. As shown in FIG. 5, the base station may have several layers of control mechanisms or protocol stacks 502, 504 and 506 that control, among other things, the bandwidth request and allocation process. The base station MAC is sub-divided into two sub-domains: (1) the high level media access arbitration (HL-MAA) MAC domain 504 and the low level media access arbitration (LL-MAA) MAC domain 506. In an exemplary embodiment, the LL-MAA MAC domain spans exactly a physical channel, and each physical channel requires an instance of the LL-MAA MAC domain. The HL-MAA MAC domain spans multiple physical channels, typically all physical channels in the same sector. A MAC domain comprises an HL-MAA MAC domain and the LL-MAA MAC domains associated with the physical channels within the HL-MAA MAC domain.

As shown in FIG. 5, the base station individually polls a CPE (as indicated by control arrow 508) by allocating bandwidth sufficient for the CPE to respond with a bandwidth request message. This bandwidth is typically allocated in an uplink sub-frame such as sub-frame 400. If the CPE MAC 510 determines that there is data to be sent for a selected connection k (typically under direction of a higher CPE control layer 512 via a control path 514), then the CPE MAC control mechanism issues a bandwidth request 516 to the base station MAC 506. If there is insufficient bandwidth available to the CPE 110 as determined by the base station's LL-MAA 506, the bandwidth request will not be granted. Else, the bandwidth request will be granted, and the grant implicitly communicated to the CPE MAC 510 by the base station allocating additional bandwidth to the CPE in the uplink sub-frame 400, as indicated by the control path 518. The CPE will then begin transmitting data to the base station over the uplink, using the bandwidth it has been allocated.

Figure 6:
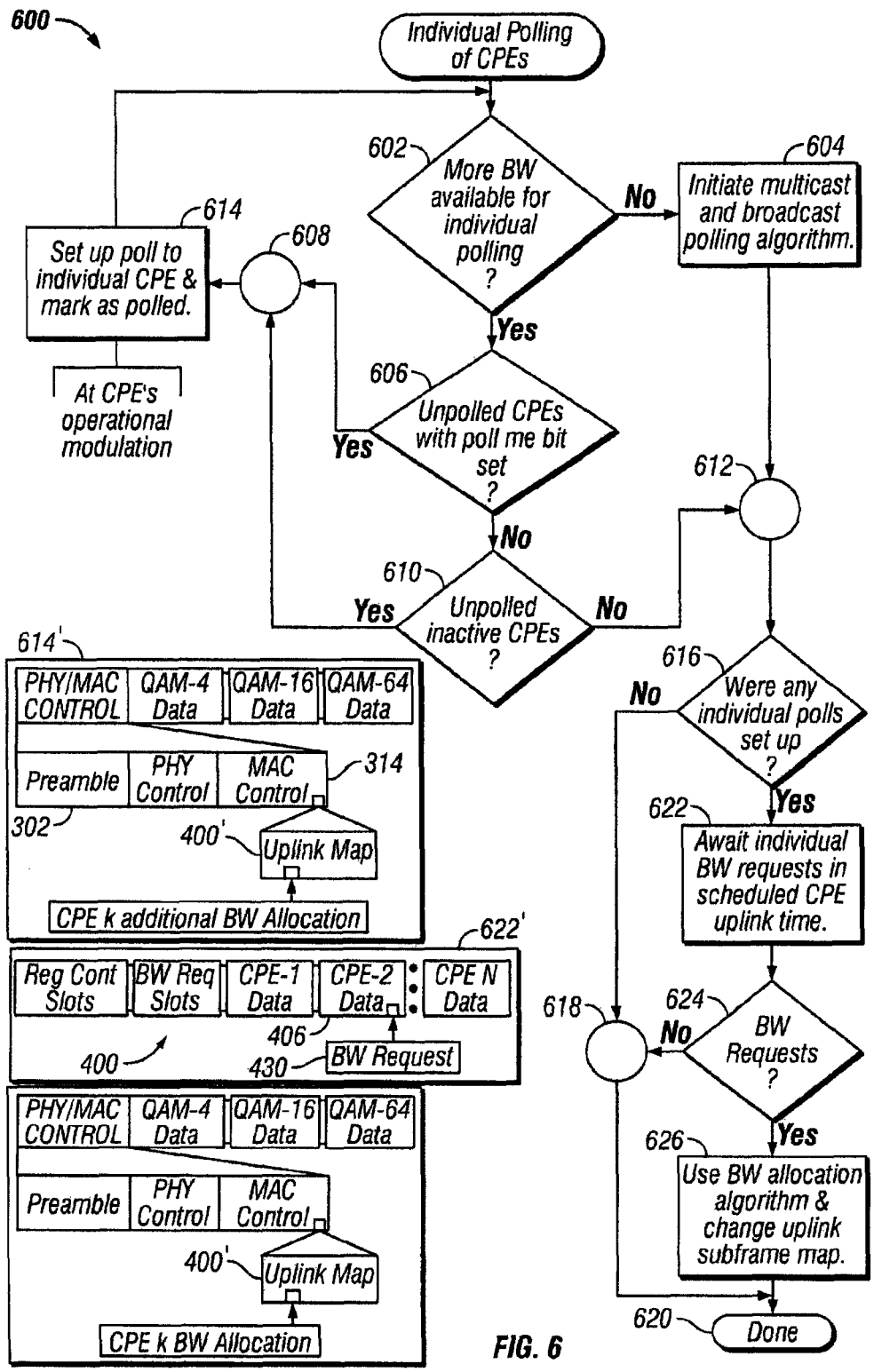
FIG. 6 is a flow diagram showing an individual polling technique.

FIG. 6 is a flow diagram showing an exemplary individual polling technique 600 for CPEs, though the techniques are generally also applicable to users other than CPEs. As shown in FIG. 6, the method starts at decision STEP 602 to determine whether bandwidth is available for the purpose of individually polling the CPEs. If no more bandwidth is available for individually polling the CPEs 110 then the method proceeds to STEP 604 to initiate multicast or broadcast polling as appropriate, techniques which are detailed in a later subsection. However, if sufficient bandwidth is available for the purpose of individually polling CPEs, the method proceeds to a decision STEP 606 whereat a determination is made whether there are any unpolled active CPEs that have a "poll-me" bit set. If so, the method proceeds to a control point 608. If not, the method proceeds to a decision STEP 610 whereat it determines whether there are any unpolled inactive CPEs present. In other embodiments, decision STEP 610 may check for other conditions, such as unpolled CPEs whose polling period has elapsed since the previous poll. If decision STEP 610 is satisfied, the method proceeds to the control point 608. If not, the method proceeds to a control point 612.

The method proceeds from the control point 608 to STEP 614 to individually poll the selected CPE. As shown in FIG. 6, at STEP 614 the base station initiates the polling of the selected CPE and marks the CPE as polled. Thus, by this method all inactive CPEs, along with unpolled active CPEs requesting polling by setting their respective "poll-me" bits, are individually polled. In alternative embodiments STEP 614 includes sub-steps to refine the polling policy for each user or group of users. Such sub-steps may evaluate one or more communication parameters for the inactive user such as a quality of service required for that user either to ensure data integrity or according to contract guarantees, and recent or average rate of bandwidth usage. A rate of polling may be selected which is a substantially continuous function based on the one or more user's parameters. The rate can be a substantially continuous function of the parameters, if a large number (e.g., over 50) of different rates may be derived from the applicable parameters, and if selected rates are derived from the parameters without restricting them to a limited number of preselected rate categories. The selected rate may be represented as a desired time between polls. A further sub-step of STEP 614 may then check whether the desired time between polls has elapsed for a particular user, and the polling and marking of STEP 614 may be restricted to those inactive users which have met or exceeded their desired time between polls.

Actions which effect polling are shown diagrammatically in FIG. 6 in the caption box 614'. The caption box 614' of FIG. 6 shows the downlink sub-frame map 300 described above in FIG. 3. The MAC control portion 314 of the MAC frame control header 302 may include an uplink sub-frame map 400'. The uplink sub-frame map 400' is communicated to the CPE MAC when the base station transmits this information to the CPE via the downlink. As shown in FIG. 6, and responsive to the polling STEP 614, the base station MAC allocates additional bandwidth to the selected CPE (in FIG. 6 this CPE is referred to as CPE "k") in the uplink. This increased bandwidth allocation is communicated to the CPE k via the uplink sub-frame map 400'.

As shown in FIG. 6, the method then returns to the decision STEP 602 to determine whether there is more bandwidth available for individually polling the CPEs. When it is determined (at the decision STEPS 606 and 610, respectively) that there are no active CPEs having a poll-me bit set and that there are no unpolled inactive CPEs present, the method proceeds to a decision STEP 616. At the decision STEP 616, the method determines whether any individual polls were performed. If not, the method proceeds to a control point 618 and the method subsequently terminates at the termination step 620. However, if individual polls were performed, the method proceeds to a STEP 622 to await the individual bandwidth requests from the CPE that was polled (e.g., CPE "k"). As shown in the caption 622' of FIG. 6, this bandwidth request 430 is generated by the polled CPE (e.g., CPE "k") during the CPE scheduled data block 406 scheduled for the selected CPE in the uplink sub-frame 400. In one embodiment, all data includes a header that indicates the type of data being transmitted. For example, in this embodiment, control messages have associated CPE-unique connection identifiers that are assigned to them when the CPE registers. The structure of the control messages allows a base station to determine that a control message is a bandwidth request.

As shown in FIG. 6, the method proceeds from STEP 622 to a decision STEP 624 to determine whether any bandwidth requests were received. If not, the method terminates. However, if so, the method proceeds to a STEP 626 whereat a bandwidth allocation method is initiated. As described in more detail below, the base station uses a bandwidth allocation method to allocate bandwidth to the requesting CPE. The bandwidth allocation is indicated to the CPE by making appropriate changes to the uplink sub-frame map 400'. The method then terminates at STEP 620.

Contention-based Polling Technique (Multicast and Broadcast Polling)

As described above with reference to STEP 604 of the individual polling method of FIG. 6, if there is not sufficient bandwidth available for the purpose of individually polling the CPEs, the base station MAC may poll the CPEs in multicast groups, and may issue a broadcast poll to all CPEs. Multicast polling may be efficient despite the risk of collision created by the technique. For example, when a particular user does not use bandwidth for a period of time, the probability that bandwidth will be requested at any particular time shrinks. As the probability of needing bandwidth shrinks, individual polls become more likely to draw a negative response (thus using bandwidth for no productive purpose), while including the user in multi-cast polls becomes less likely to cause bandwidth-wasting collisions. Consequently, it becomes progressively more efficient to poll a plurality of such inactive users at the same time, using a single contention slot of bandwidth to provide request opportunities to the plurality of users.

In order to minimize the probability of collisions when multicast polling must be used to conserve bandwidth, users may be polled in groups as small as two users. A significant portion of bandwidth needed to individually poll any given number of users may be saved by multicast polling the users, even in small multicast groups. In this event, it is desirable that the probability of collision, multiplied by the average bandwidth consumed to resolve such collision, is less than the time required for the individual polls which are avoided by the multicast polling. Probability of a collision may be estimated based on the time since last bandwidth use, the expected rate of bandwidth use, and time since the last poll.

In order to reduce collisions by effectively reducing the polling group size, multicast polling group members who are individually polled in an uplink subframe may be precluded from responding to a multicast poll in the same subframe. When this process results in only two eligible respondents in a multicast polling group, then responses identified as probably collisions can be interpreted as bandwidth requests by each. Users which have been individually or multicast polled may be precluded from responding to a broadcast poll, which may thus provide the remaining users an opportunity to request bandwidth.

Multicast polling may be handled differently when the user entity is, for example, a connection rather than a CPE. Discrete CPEs generally have, no information regarding bandwidth needed by other CPEs in the same multicast poll contention slot. However, because a CPE handling communication to a plurality of individual connection "users" must coordinate bandwidth request transmissions from different users, "collisions" between competing users at a particular CPE can be resolved by consolidating higher priority bandwidth requests, and postponing lower priority requests while setting the "poll-me" message in the allocated packet. Because of the bandwidth request coordination which can be performed by a CPE, multi-cast polling a plurality of discrete users serviced by a particular CPE can be relatively efficient.

Multicast polling is preferably accomplished by special "addressing" or identification of bandwidth allocations indicated in the uplink subframe map. This is best understood in the context of an exemplary overall addressing scheme. The addressing of CPEs may be performed as follows: each CPE is assigned a unique permanent address (e.g., in one embodiment the CPE has a 48-bit address) that is used in the registration process; and each CPE is also given a basic connection ID (e.g., in one embodiment the CPE is given a 16-bit basic connection ID and a 16-bit control connection ID during the registration process). Each service that is provisioned for a selected CPE is also assigned a connection ID. Connection IDs are generated by the base station MAC (specifically, by the base station HL-MAA) and are unique across an HL-MAA MAC domain. The basic connection ID that is assigned when the CPE is registered with a base station is used by the base station MAC and the CPE MAC to exchange MAC control messages between the CPE and the base station. The control connection ID (also assigned during registration) is used by the base station and the CPE to exchange control and configuration information between the base station and the CPE higher levels of control. Sub-groups of connections communicating via the CPE may also be identified at both the CPE and base station ends with a group designation, and may be treated as discrete users. Bandwidth requests are processed from discrete users, and bandwidth is generally allocated to discrete users; such users must be identifiable, and may be a CPE, an individual connection, or a sub-group of connections.

Certain connection IDs may be reserved for multicast groups, sub-group users, and broadcast messages. Of all of the addresses available, a portion may be reserved for multicast use. For example, if the four most-significant bits of the connection ID are set to logical ones (hex "Fxxxx"), the address is interpreted as being set aside for multicast use. This provides a total of 4K distinct multicast addresses. One example of such a multicast use is for the distribution of a video service. The connection ID used to indicate a broadcast to all stations may be (0xFFFF) (i.e., all 16 bits are set to a logical one). Each user may recognize a specific user identification, and also a number of different multicast polling addresses for multicast groups of which the user is a member. One of the recognized multicast polling addresses will generally be a broadcast polling address.

Figure 7:
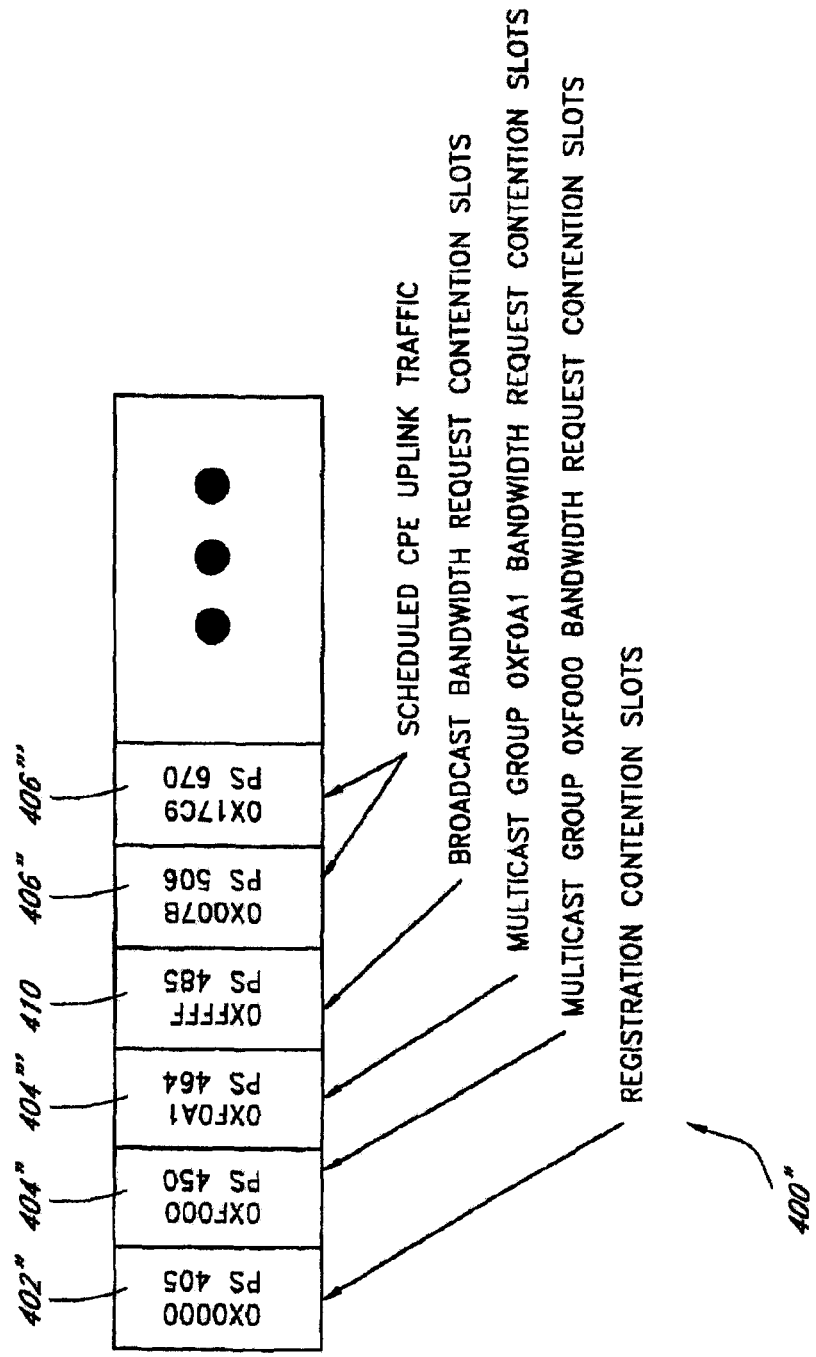
FIG. 7 shows an exemplary uplink sub-frame map for multicast/broadcast polling.

As with the individual polling technique described above with reference to FIGS. 5 and 6; the multicast polling message need not be explicitly transmitted by the base station to the CPE. Rather, the multicast poll message is implicitly transmitted to the CPE when the base station allocates bandwidth in the uplink sub-frame map. However, rather than associating allocated bandwidth to a user's specific basic connection ID as done when performing an individual poll, the base station associates the allocated bandwidth to a multicast or broadcast connection ID. Each user will preferably respond to the base station using bandwidth specifically addressed to it if available, using bandwidth provided for a multicast polling address if no bandwidth is specifically addressed to it, and responding to a broadcast poll only if no bandwidth is available for either its specific address or a multicast group. Multicast/broadcast bandwidth allocation is shown in the multicast/broadcast uplink sub-frame map 400" shown in FIG. 7. It is instructive to compare the uplink sub-frame 400 (FIG. 4) used by the base station when individually polling the CPEs, with the uplink sub-frame map 400" of FIG. 7. FIG. 7 shows the uplink sub-frame map which is transmitted in the MAC control portion of the downlink.

As shown in FIG. 7, the multicast/broadcast uplink sub-frame map 400" includes registration contention slots 402" that map the registration contention slots 402 of FIG. 4. Rather than associating allocated bandwidth with a selected user's specific basic connection ID, the allocated bandwidth is associated with a reserved registration ID, e.g. 0x0000. As further shown in FIG. 7, the uplink sub-frame map 400" may include a plurality of separate multicast group bandwidth request contention slots 404", 404'", etc. As shown, a number of PSs are provided for each contention slot, and they provide adequate time for a number of non-colliding bandwidth request packets by as many different users which belong to the multicast poll group indicated by the address, e.g. 0xF000. When a contention slot encompasses a plurality of bandwidth units, the user may be instructed to utilize a random portion of any such contention slot. Alternatively, the user may be expressly directed to utilize a particular part of such slot, such as first, third, or last bandwidth unit within the contention slot. Such bandwidth units will vary with the architecture of the system, but may for example be a single PI (defined by the system coding scheme), or a minimum packet size. The uplink sub-frame map 400" may also include broadcast bandwidth request contention slots 410, reserved for an address recognized for this purpose, e.g. 0xFFFF. Finally, similar to the uplink sub-frame of FIG. 4, the uplink sub-frame map used to initiate multicast or broadcast polls may include a plurality of CPE scheduled data blocks 406", 406', etc., to transport uplink traffic data.

Figure 8:
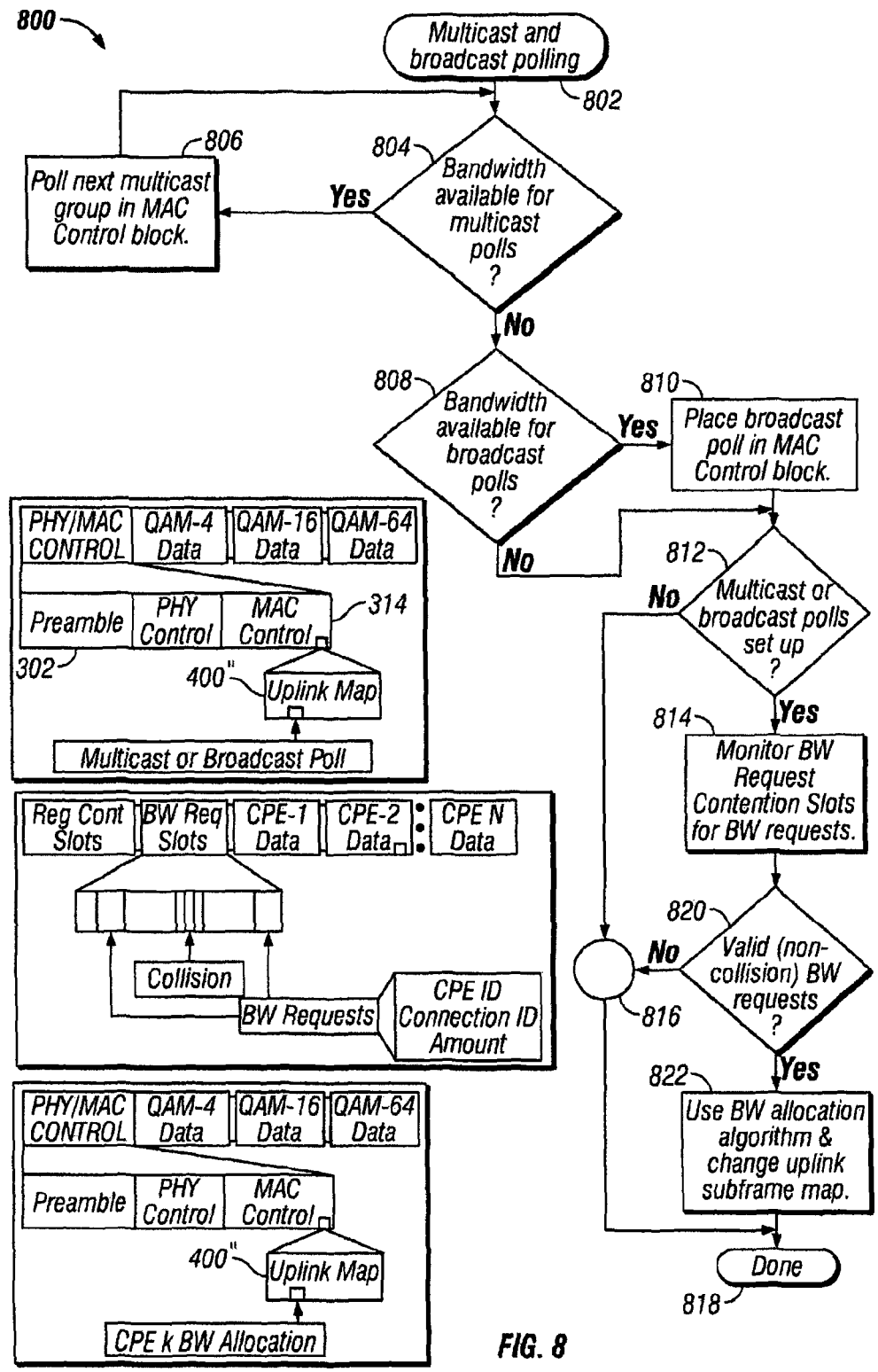
FIG. 8 is a flow diagram showing a multicast and broadcast polling technique.

FIG. 8 is a flowchart showing a multicast and broadcast polling method 800. As shown in FIG. 8, the group polling method 800 proceeds from an initial step 802 to a decision STEP 804 whereat the method determines whether there is sufficient bandwidth available for multicast polls. If sufficient bandwidth is available for multicast polls, the method proceeds to a STEP 806 to poll the next multicast group in the MAC control portion 314 of the MAC frame control header 302. However, if there is insufficient bandwidth available to perform a multicast poll, the method proceeds to a decision STEP 808 whereat the method determines whether there is sufficient available bandwidth for performing a broadcast poll. If so, the method proceeds to a STEP 810. If not, the method proceeds to a decision STEP 812.

As shown in FIG. 8, at the STEP 810 a broadcast poll is initiated by placing the broadcast poll in the MAC control portion 314 of the MAC frame control header 302. Similar to the individual polling technique, the multicast poll message is implicitly transmitted to the CPE by allocating bandwidth in the uplink sub-frame map 400". The allocated bandwidth is associated with a multicast or broadcast connection ID.

At the decision STEP 812 the method determines whether a broadcast or multicast poll was initiated. If so, the method proceeds to a STEP 814 whereat the method monitors the appropriate bandwidth request contention slots (e.g., as defined by the bandwidth contention slot descriptions 404", 404'", and the broadcast bandwidth request contention slot descriptions 410 of FIG. 7). If no broadcast or multicast poll was initiated, the method proceeds to control point 816 and then terminates at a termination STEP 818.

The method proceeds from the monitoring STEP 814 to a decision STEP 820 to determine whether valid (i.e., non-colliding) bandwidth requests were detected. If no valid bandwidth requests were detected at STEP 820, the method proceeds to the control point 816 and terminates at termination STEP 818. However, if the method detects valid bandwidth requests, the method proceeds from STEP 820 to STEP 822. At STEP 822 the method uses a convenient bandwidth allocation algorithm to allocate bandwidth to the CPE that requested bandwidth. A bandwidth allocation algorithm is described below in more detail with reference to FIGS. 12-13. The bandwidth is allocated in the uplink sub-frame map 400" as shown in FIG. 8.

When a poll is directed to a multicast or broadcast connection ID, users belonging to the polled group may request bandwidth by employing the bandwidth request contention slots (either the multicast contention slots for the group specified or the broadcast bandwidth request contention slots 410) allocated in the uplink sub-frame map 400". In order to reduce the likelihood of collisions, only CPEs needing bandwidth are allowed to reply to multicast or broadcast polls, such that zero-length bandwidth requests are not permitted in the bandwidth request contention slots. CPEs may transmit the bandwidth requests in the bandwidth request contention slots (e.g., contention slots 404) using a modulation they are presently assigned, or may be required to employ a more robust modulation such as QPSK. In an exemplary embodiment, the contention slots are sized to hold a 1-PS preamble and bandwidth request message. Due to physical resolution characteristics of the coding scheme used, the message requires 1 PI (e.g. one Reed-Solomon code), which may require six PS of 1.25 μS each using QAM-4 modulation, and correspondingly less PSs in higher modulations. In other embodiments, two PIs is the smallest practical size for a message, formatted as an ATM cell. Multiple bandwidth request messages from the same CPE may be multiplexed in a single bandwidth request contention slot without increasing the bandwidth utilization or the likelihood of collisions occurring. This allows the same CPE to make multiple bandwidth requests in the same slot, whether the "user" is the CPE or is a subset of connections served by the CPE.

When multiple CPEs attempt to simultaneously utilize a given contention slot which can only accommodate a single bandwidth request, a collision will occur. In order to reduce the likelihood of such collisions, a multicast poll may allocate sufficient bandwidth for a bandwidth request contention slot to accommodate a plurality of bandwidth requests. Each of the CPEs which are members of the multicast polling group addressed may be instructed to transmit their bandwidth requests randomly within one of such request slots. Alternatively, the multicast polling group can be broken into as many different multicast polling sub-groups as there are bandwidth request slots available, and the single multicast polling contention slot may be broken into a plurality of distinct contention slots each having, for example, only enough bandwidth for a single bandwidth request. In this manner, only a few CPEs contend for each bandwidth request slot.

Multicast polling is useful when there is insufficient time to individually poll, within a suitable interval, all inactive users. It is particularly efficient for servicing very low-usage users. The base station is able to define contention periods both for multicast groups and also for all users generally (i.e., broadcast). After user scheduled data, CPE control messages, and polling bandwidth has been allocated, the base station may allocate all remaining unused time in the upstream frame to contention for any combination of multicast bandwidth requests and CPE registration requests.

A CPE needing to transmit in a contention slot which spans more than one bandwidth request period may randomly select a bandwidth request period within the interval, and initiate a request transmission in the starting PS of the selected bandwidth request period. This randomization minimizes the probability of collisions. Some systems ordinarily utilizing plural-PI packets for normal data may recognize single-PI packets as bandwidth requests or "poll-me" messages, thereby reducing the likelihood of collisions during contention slots.

If an error occurs when performing either a multicast or broadcast poll (such as the detection of an invalid connection ID) the base station transmits an explicit error message to the CPE. If the base station does not respond with either an error message or a bandwidth allocation request within a predefined time period, the CPE will assume that a collision occurred. In this event, a contention resolution process must be initiated.

Contention Resolution Process

A collision is presumed if there is no response from the base station to the request within a pre-defined time period, whereupon a pre-defined contention resolution process is desirably initiated. For example, the CPE may use the well-known "slotted ALOHA" contention resolution process to back off and try at another contention opportunity.

The following resolution process may be used: Assuming that the initial backoff parameter is i and that the final backoff parameter is f, 1. On the first collision, the CPE waits a random interval between zero and $2^i$ contention opportunities and then tries again.

2. If another collision occurs, then the interval is doubled and the CPE tries again, repeating until the interval $2^f$ is reached.

If the CPE is still unsuccessful, an error is reported to the system controller and the contention process is aborted. Other contention resolution mechanisms can be used, such as the well-known Ternary tree mechanism.

Poll-Me Message

As described above with reference to FIGS. 3-8, a currently active CPE may set a "poll-me" or a "priority poll-me" bit or message in a MAC packet in order to indicate to the base station a need for further bandwidth allocation. For example, a selected CPE may request a poll by setting a poll-me ("PM") bit in the MAC packet header. Similarly, a selected CPE may set a priority poll-me ("PPM") bit in the MAC header in order to indicate that a priority poll is desired. Those skilled in the art will understand that though the PM bit and the PPM bit are described as a bit, they may be implemented as any convenient message communicating a need to be polled. For example, they may be indicated by one or more of 16 possible control messages in a 4-bit control message, or one or two of 4 possible messages in a 2-bit control field. While a large dedicated poll-me message field will consume significant effective bandwidth, multiple-bit messages can be efficient. For example, a two-bit poll-me message field can request 0, 1 or 2 bandwidth units, with one combination (e.g. 00) reserved to indicate that a further bandwidth message is disposed at some predetermined location elsewhere within the packet. Such other location may be, for example, connection ID bits which are presently unnecessary, or may be disposed within a trailer in the payload of the packet. Such a request for further bandwidth within existing bandwidth units may be more like a "poll-me" message if it is disposed in a header field, or more like "piggybacking" if the request is disposed in the packet payload.

Figure 9:
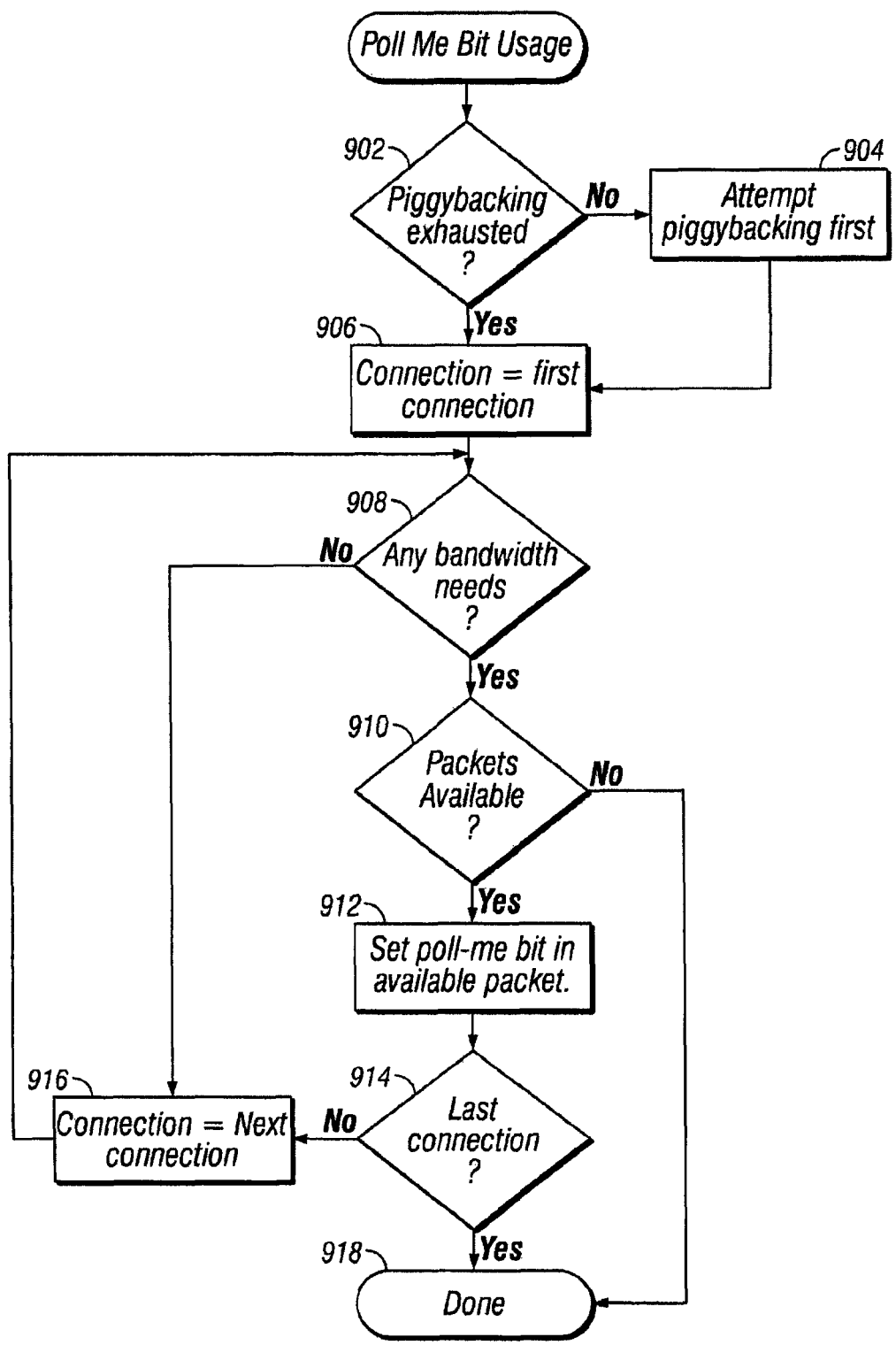
FIG. 9 is a flow diagram showing use of a "poll-me" message to stimulate polling.

It is advantageous to avoid polling those users which already have bandwidth allocated except in response to a "poll-me" message. A "poll-me" procedure by which a CPE can stimulate a base station to poll the CPE is shown in FIG. 9. When the base station detects a request for polling, the polling process illustrated in FIG. 10 may be employed to satisfy the request, if bandwidth is available.

FIG. 9 is a flow chart illustrating use of a poll-me bit by a CPE to stimulate polling. As shown in FIG. 9, the method first determines at a decision STEP 902 whether the "piggybacking" technique described in more detail below has been exhausted. If not, the method proceeds to STEP 904 and attempts to perform "piggybacking" first. The method then proceeds to a STEP 906 whereat the connection is set equal to a first connection. The method shown in FIG. 9 then proceeds to a decision STEP 908 to determine whether any bandwidth needs exist. The bandwidth needs are examined in this manner for each connection within the CPE in turn, for example by observing that a packet identified with a particular connection ID is completed for sending, or through a separate process for tracking bandwidth needs and priorities. If the connection does not have bandwidth needs, then the method proceeds to a STEP 916 and scans for the next connection. If a bandwidth need exists, the method proceeds to a decision STEP 910. At STEP 910 the method determines whether any more packets are available for accommodating the poll-me bit. If not, the method terminates at the STEP 910. However, if packets are available, the method proceeds to a STEP 912 and sets a poll-me bit in an available packet. The STEP 912 may also include preparation of the packet which will be transmitted when bandwidth is allocated to the CPE by the base station polling the CPE; for example, after a first connection is found to need bandwidth, the poll-me bit may be set and a first bandwidth request disposed in the packet which will be sent in response to polling bandwidth, and after a second connection is determined to have bandwidth needs, the responsive packet may be modified to contain a second bandwidth request. Thus, the number of packets to be requested when the requested polling bandwidth is received may be determined as a part of this method. The packets requested may be identified as to simply number, with or without parameters such as priority and/or connection or connection group identification.

Figure 10:
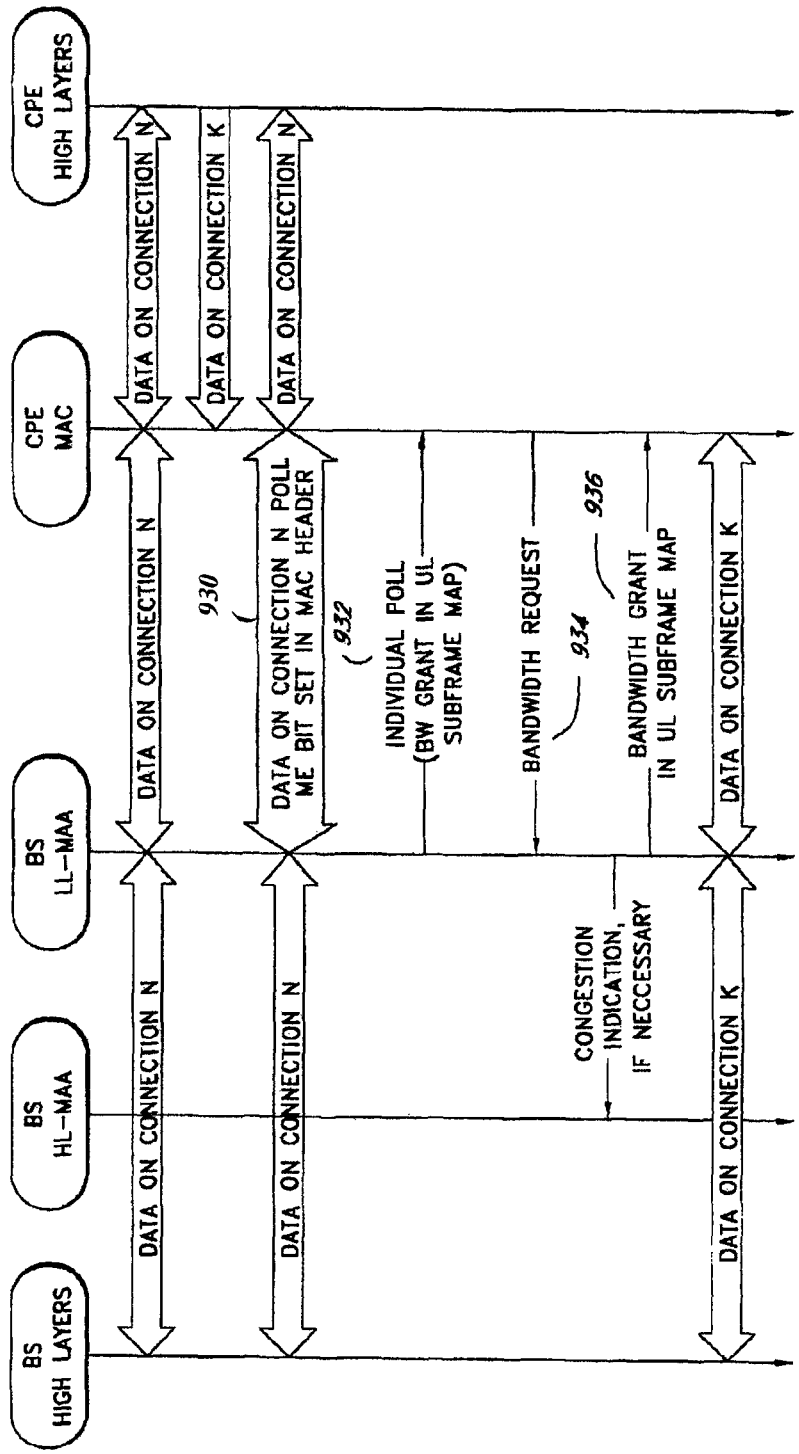
FIG. 10 shows a message sequence for requesting polls using a "poll-me" bit.

FIG. 10 shows a message sequence that may be used in requesting polls using the "poll-me" message described above. As shown in FIG. 10 at data connection 930, the CPE initiates a polling sequence by setting a poll-me message in the MAC header of a connection packet. The base station MAC responds via data message 932, individually polling the selected CPE by allocating bandwidth to the selected CPE in the uplink sub-frame map. The selected CPE subsequently responds with a bandwidth request disposed in communication 934, which is sent to the Base Station in the uplink bandwidth which was allocated in downlink message 932. In response to the CPE's bandwidth request, the base station grants bandwidth and allocates bandwidth to the CPE in the uplink sub-frame map as shown in communication path 936. The selected CPE then transmits data to the base station, typically for a connection which caused the request, during the timeslots allocated for it in the uplink sub-frame map.

"Piggybacking" Technique

As described above, in order to reduce overhead bandwidth necessary for the bandwidth allocation process, currently active CPEs may "piggyback" a bandwidth request (or other control message) on their current transmissions. The CPEs may piggyback bandwidth by using unused bandwidth in packets of existing bandwidth allocations. A procedure for using excess bandwidth in this manner is shown in FIG. 11.

Figure 11:
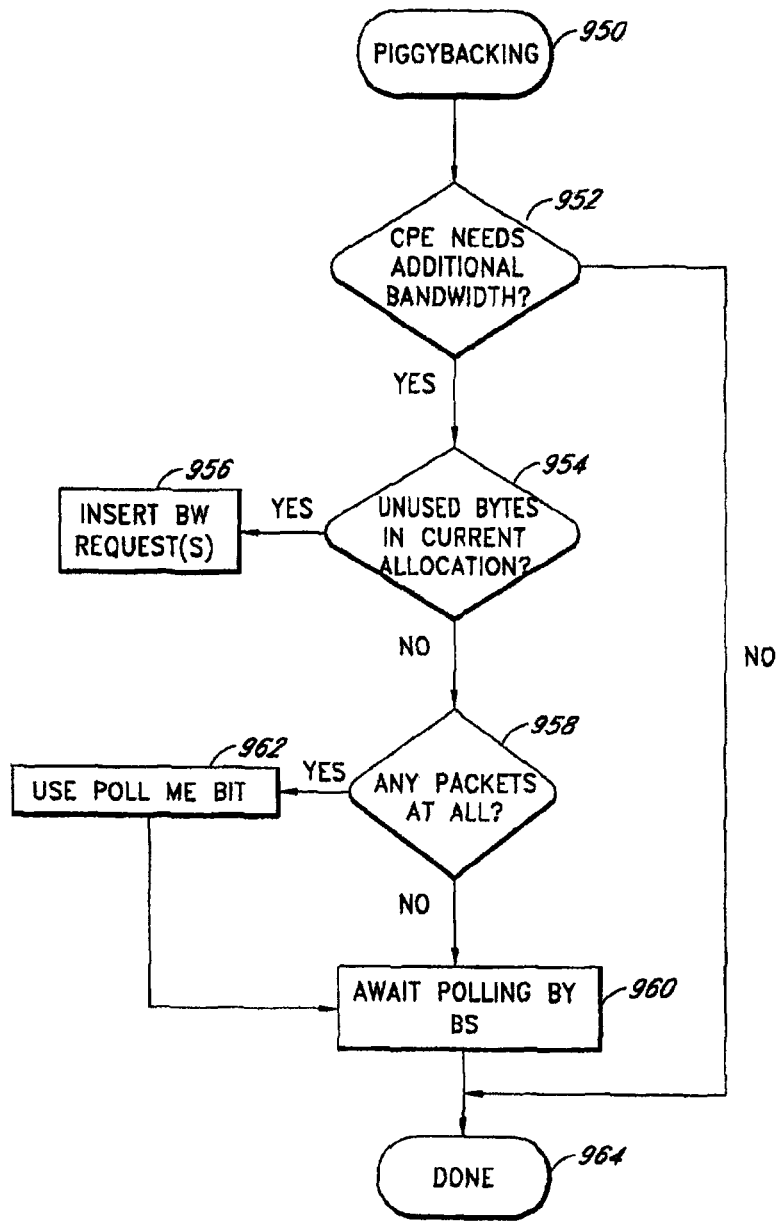
FIG. 11 is a flow diagram showing a bandwidth request piggybacking process.

The method shown in FIG. 11 initiates the piggybacking process at STEP 950. The method proceeds to a decision STEP 952 to determine whether the CPE requires additional bandwidth. If so, the method proceeds to a decision STEP 954, if not, the method proceeds to a termination STEP 964 whereat the method terminates. At the decision. STEP 954 the method determines whether any unused bytes exist in the current allocation. If so, the method proceeds to insert bandwidth requests into the unused bytes at STEP 956. If not, the method proceeds to a decision STEP 958. At the decision STEP 958, the method determines whether any packets at all are allocated to the CPE. If there are no packets found at the decision STEP 958, the method proceeds to STEP 960. However, if packets are allocated, the method proceeds to a STEP 962 whereat the CPE sets a poll-me message (which may be a single bit, as discussed above) in a packet which is available but does not have enough unused bytes to accommodate a complete bandwidth request. The method then proceeds to the STEP 960 whereat the CPE awaits polling by the associated base station. The method then terminates at the STEP 964.

Bandwidth Allocation

Much of the foregoing has focussed on techniques and processes whereby a base station may determine bandwidth needs for all users. This process of obtaining bandwidth requests is part of the overall process of controlling bandwidth allocation, which is one of the basic functions of the MAC (media access controller). As described above, the base station MAC is responsible for allocating the available bandwidth of a physical channel on the uplink and the downlink. Within the uplink and downlink sub-frames of a particular communication physical channel, the base station lower layer media access arbitration (LL-MAA) MAC scheduler allocates the available bandwidth between the various services sharing the physical channel in response to user requests, taking into account the priorities and rules imposed by their contractual and physical quality of service (QoS) requirements. A base station generally handles traffic on a plurality of different physical channels. The traffic on different physical channels, and sometimes load sharing between them, is generally provided by higher control sub-layers of the base station MAC. Thus, bandwidth is allocated between physical channels according to connection assignments made by the high level media access arbitration of the MAC (HL-MAA MAC) layer, while bandwidth is allocated within a particular physical channel according to uplink and downlink sub-frame maps. The uplink and downlink sub-frame maps may be sharing time on the same carrier frequency (TDD) or may each have their own distinct frequency (FDD). In either direction of transmission (uplink or downlink), bandwidth allocation is possible by any "multiple access" technique; that is, the shared medium may be divided according to time increments (TDMA), code division units (CDMA), or a combination of the two. The embodiments described herein primarily describe TDMA techniques for sharing the media, but the skilled person will be able to practice the techniques described herein using CDMA techniques as well. CDMA access units, i.e. a particular code within a broad channel, may be utilized in place of the physical slot (PS) units which are described most frequently herein. In many cases, basic CDMA bandwidth units are larger than the PIs described herein, so that bandwidth would be divided somewhat more coarsely. However, the CDMA access units may be further subdivided using TDMA techniques to provide finer bandwidth divisions. In either event, the resulting bandwidth divisions may be utilized in generally the same manner as PS or PI units described herein.

Downlink Bandwidth Allocation

Referring first to FIG. 2, the base station will have some number of the PSs in a TDM frame available for downlink transmissions; for ATDD operation, the number depends upon the ATDD split 210 shown in FIG. 2. First, the base station allocates PSs in the downlink frame for PHY Control and enough PSs for at least 1 PI for the MAC Control. The base station may calculate uplink bandwidth allocation before downlink bandwidth allocation in order to determine the number of PIs to allocate for the MAC Control. In one embodiment, the PHY Control and MAC Control are always sent using QAM-4 modulation, and is typically sent at a modulation level robust enough for all receiving CPEs.

The base station determines the number of PIs required to transmit pending downlink data for each CPE. This number is then converted to PSs as a function of the modulation used for the CPE associated with each connection. The data pending data is queued, as explained below, according to QoS or priority, and bandwidth is first allocated for highest QoS data. For each remaining QoS, or until available bandwidth is entirely allocated, the base station determines if there is enough bandwidth to satisfy the entire need of the QoS queue. If so, the base station allocates the required bandwidth. Otherwise, if there is not enough bandwidth to satisfy the queue, the base station implements a queue-specific fairness algorithm described elsewhere.

Figure 12:
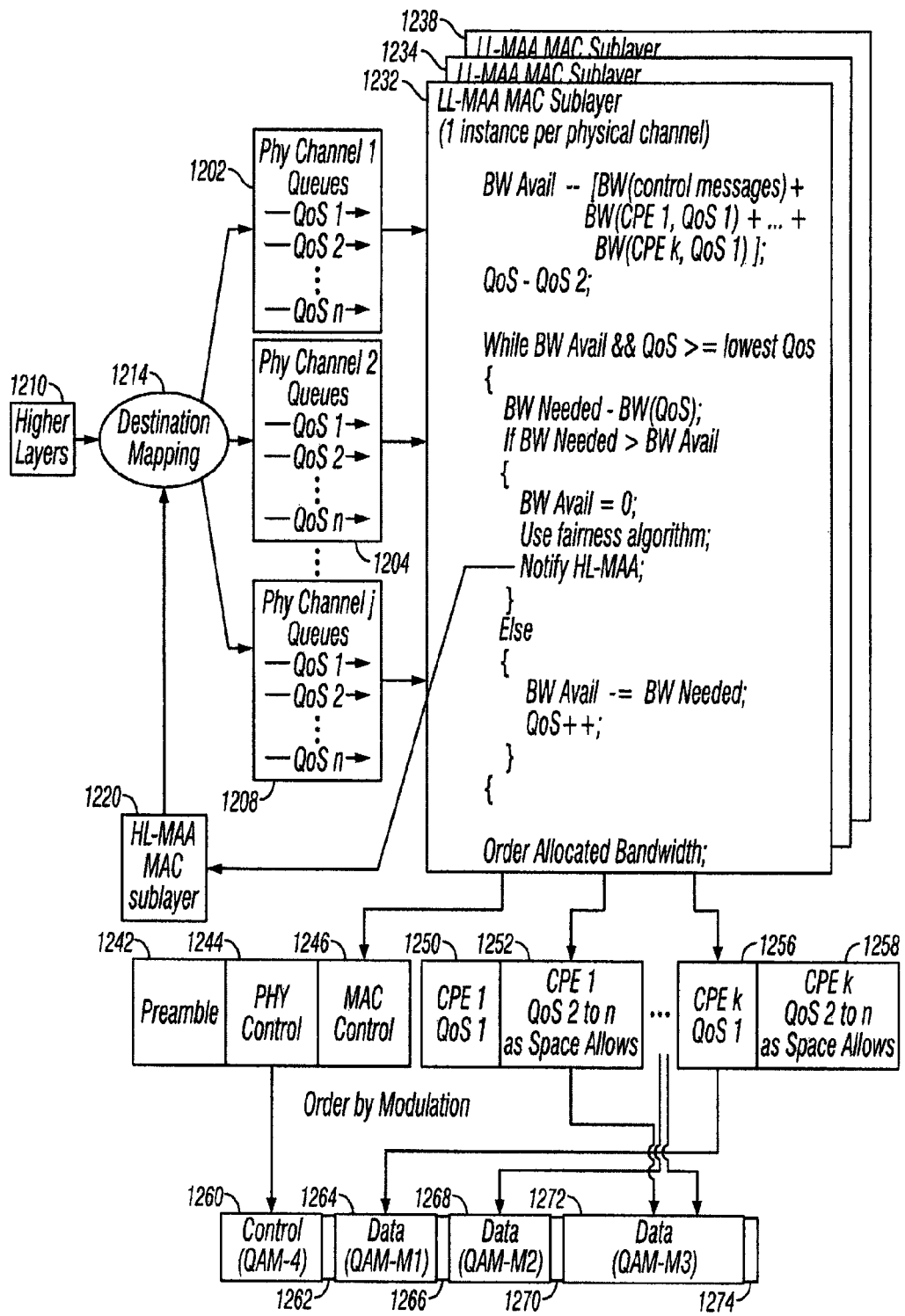
FIG. 12 shows a downlink bandwidth allocation method.

The downlink bandwidth may be allocated from queues as shown in FIG. 12. By this procedure, the base station MAC maintains a set of queues for each physical channel (e.g. 1202-1208) that it serves. Information for transmission to particular connections arrives from higher layers 1210, and is mapped in a destination mapping step 1214 under the control of the HL-MAA MAC sublayer 1220. Within each physical channel queue set 1202-1208, the base station may maintain a queue for each QoS or priority. The queues hold data that is ready to be transmitted to the CPEs present on the physical channel. The higher layers 1210 of the base station protocol stack (which may be realized in software, or in hardware such as an ASIC) are responsible for the order in which data is placed in the individual queues within the physical channel queue sets 1202-1208. The base station higher control layers, e.g. the HL-MAA MAC sublayer 1220, are free to implement any convenient fairness or traffic shaping algorithms regarding the sharing of access between connections at the same QoS, without impacting the base station lower layer media access arbitration (LL-MAA) MAC control layers 1232-1238. Once data is present in the queues it is the responsibility of the base station LL-MAA MAC sublayers 1232-1238 (e.g., the BS LL-MAA of FIGS. 5 and 10) to allocate bandwidth based on the QoS.

In determining the amount of bandwidth to allocate at a particular QoS for a particular CPE, the base station may take into account the QoS, modulation, and the fairness criteria used to keep an individual CPE from demanding excessive bandwidth. Such arbitration activity is represented by the sketched program steps shown in LL-MAA MAC sublayer 1232; it will be understood that many hardware and software implementations of such arbitration are possible. For example, bandwidth may be allocated in QoS order. If there is a queue that cannot be transmitted entirely within a particular frame, a QoS specific fairness algorithm, such as fair-weighted queuing, may be used within that queue. According to this process, each connection is given a portion of the remaining available bandwidth based upon the relative weight of the connection. The derivation of connection weights is QoS-dependant. For example, ATM traffic may be weighted based upon contractual bandwidth limits or guarantees for each connection. IP and other delay-tolerant traffic, such as Ethernet, or ATM traffic encapsulating such delay-tolerant traffic, may all receive identical weights, or may be adjusted for contractual QoS guarantees. The allocated data is sorted for modulation type, which affects the portion of available time consumed for each allocated connection unit.

A downlink frame (or subframe, in the case of any form of TDD) provided for a particular physical channel by, e.g., the LL-MAA MAC sublayer 1232 may include a preamble 1242, physical connection control information 1244, MAC control information 1246, data 1250 for a CPE 1 connection having a QoS of 1 (high priority), data 1252 for another connection of CPE 1 which has a lower QoS, data 1256 for a CPE k at QoS 1, and data 1258 for another connection of CPE k which has a lower QoS. The first portions 1242, 1244 and 1246 of the data are generally provided to all CPEs sharing the channel. As such, this first portion will generally be sent first, and at the most robust modulation required by any CPE. Such robust modulation may be, for example, QAM-4, QAM, or quadrature phase-shift keying (QPSK). If any part of the downlink is broadcast, and if some inactive CPEs do not have an established modulation, then the most robust modulation available may be used.

As can be seen, then, the data which was organized by target CPE is preferably reorganized by the modulation technique presently used by the CPE: The preamble 1242 and other control data 1244, 1246 is shown organized for transmission in the first transmission block 1260 at the Control modulation of QAM-4. The modulation used in the first modulation block 1260 is generally the most robust modulation of the downlink frame (or subframe). While in this case it is indicated to be QAM-4, the skilled person will understand that even more robust modulations such as QAM may be necessary for the transmission block 1260, and that higher speed but less robust modulation types such as QAM-16 may be acceptable, depending on the characteristics of the least robust connection served. Next, it is shown, representatively, that the data 1256 and 1258 for CPE k is at the next lower modulation level QAM-M1, in modulation block 1264, which is separated from the first modulation block 1260 by the modulation transition gap 1262. M1 is a different modulation from that used in the modulation block 1260, and preferably is the next most robust modulation level which is needed. In this way, each CPE which will accept data from within a later modulation block will be able to keep track of the data in preceding blocks so as not to lose registration to the preamble. Each CPE does not need to have a different modulation used, and the skilled person will appreciate that if CPE k required instead the lowest modulation, as is used in modulation block 1260, then the data for CPE k could be concatenated with the control data within the modulation block 1260. Similarly, data for many different CPEs having the same modulation level may be transmitted in the same modulation block, e.g. 1264, 1268 or 1272. As shown in FIG. 12, CPE 1 utilizes a significantly faster (and less robust) modulation QAM-M3, and accordingly the data 1250 and 1252 for CPE 1 is reorganized so as to be transmitted in transmission block 1272. Transmission block 1272, at modulation QAM-M3, is separated from transmission block 1268, which utilizes modulation QAM-M3, by a modulation transition gap 1270, and is separated from later modulation blocks (or possibly from uplink subframes in TDD systems) by modulation transition 1274. Data for unspecified CPEs is shown as being ordered by modulation into transmission block 1268 (at QAM-M2) and transmission block 1272, but the skilled person will appreciate that data will be ordered into any and all of the transmission blocks which are used.

Uplink Bandwidth Allocation

The ATDD split described above with reference to FIG. 2 will generally provide at least some PSs in the TDD frame available for uplink transmissions (in FDD, all uplink slots are available each frame, and in ordinary TDD a fixed quantity of uplink slots are available for each same-sized frame). In order to determine how to allocate the available uplink bandwidth, the base station may maintain an estimate of the data and control messages pending at each QoS for the CPEs that it serves, based upon received bandwidth requests and observed actual data traffic (i.e., connection establishment, "poll-me" messages, etc.). Pending uplink bandwidth at each priority or QoS may be calculated and granted separately, so that bandwidth may be allocated for the highest priority QoS data first, while lower QoS data is balanced against other CPE needs at that QoS. Expected uplink bandwidth from each user (or from a plurality of users sharing the same CPE or modulation) is converted to a number of PIs required to communicate the data. The number of PIs is then converted to a required number of PSs, based on the modulation.

Bandwidth is generally allocated for the highest QoS data first. For example, Continuous Grant (CG) connections having a current bandwidth that is less than the maximum bandwidth may be allocated uplink bandwidth that is the smaller of 1) their maximum bandwidth, or 2) their current bandwidth plus the bandwidth necessary to send a CG bandwidth change message. Noncompressible CG always receives their maximum grant.

For each remaining QoS, or until available bandwidth is entirely allocated, the base station determines if there is bandwidth sufficient to satisfy the entire need of the QoS queue and it then allocates the required bandwidth. Otherwise, the base station implements a queue-specific fairness algorithm, as described elsewhere.

Figure 13:
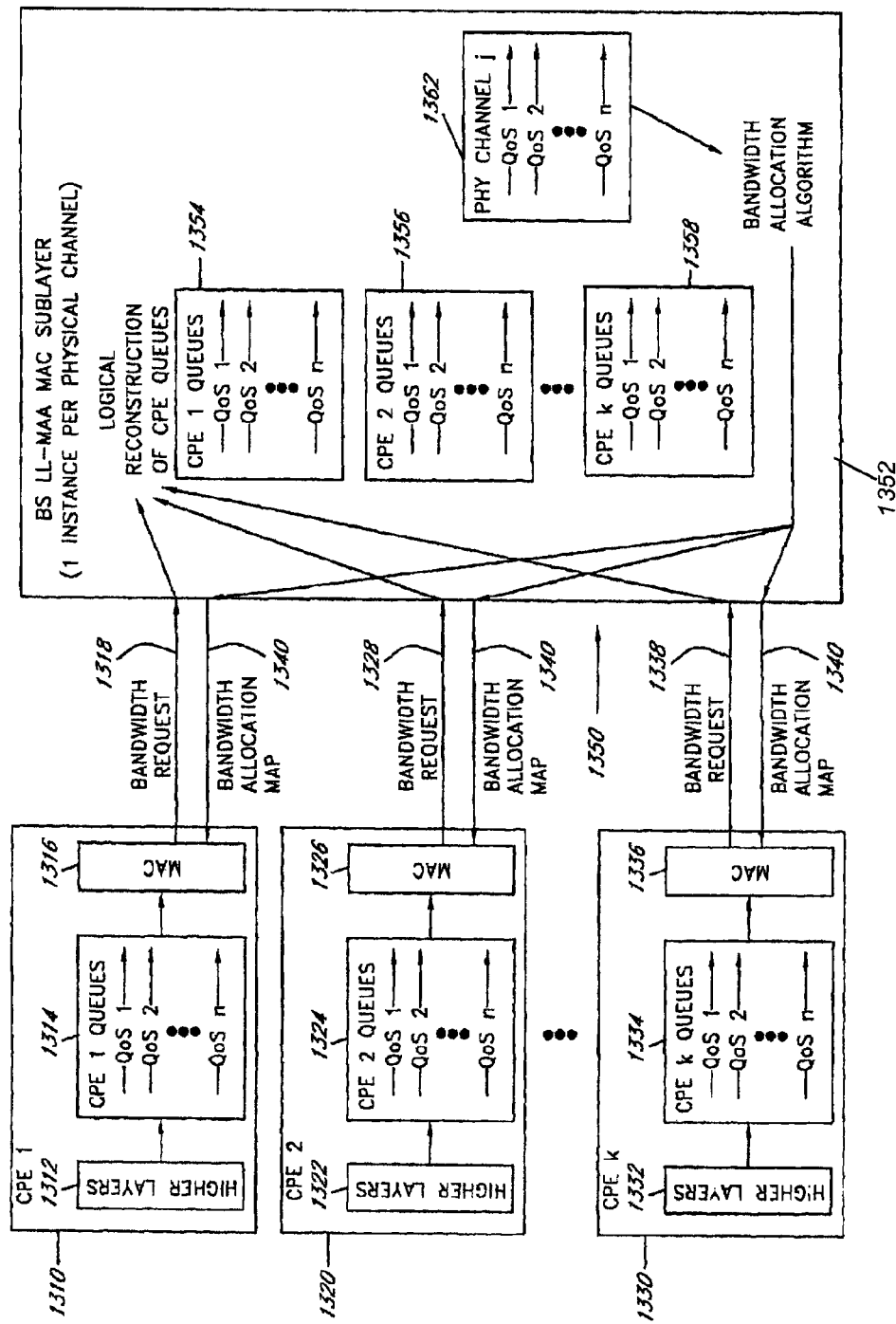
FIG. 13 shows an uplink bandwidth allocation method.

An exemplary uplink bandwidth allocation method shown in FIG. 13 is very similar to the downlink bandwidth allocation method described above with reference to FIG. 12. However, rather than being maintained by the base station, the data queues are distributed across and maintained by each individual CPE, e.g. 1310, 1320 and 1330. Rather than check the queue status directly, the base station may receive requests for bandwidth in the uplink communications, e.g. 1318, 1328 and 1338 from the CPEs using the techniques described above with reference to FIGS. 3-11. Using these bandwidth requests, received for each channel by a LL-MAA MAC, e.g. 1352, the base station 1350 may reconstruct logical pictures, e.g. 1354, 1356 and 1358 of the state of the CPE data queues e.g. 1314, 1324 and 1334 to form an overall uplink queue picture 1362 of the entire channel. Based on this logical view of the set of queues, the base station allocates uplink bandwidth in the same way as it allocates downlink bandwidth. As described above, the bandwidth allocated to any selected CPE is transmitted to the selected CPE in the form of bandwidth being allocated in the uplink sub-frame map for the selected CPE. Such transmission may be included in control information 1340 which is transmitted from the base station LL-MAA 1352 to each CPE sharing the channel. The selected CPE may then allocate this bandwidth across its connections, if the CPE is the "user" level; otherwise, the bandwidth May be identified for particular connection users or connection group users within the CPE. The user CPE may use the bandwidth in a different manner than expected, for example if it receives higher priority data while awaiting the bandwidth allocation. It is also possible to have a CPE serving lower level users, such as connection users, to coordinate bandwidth requests from a plurality of its users, and to negotiate reallocation of allocated bandwidth between different users if conditions Change. As described above, the bandwidth allocations are in a constant state of change owing to the dynamic nature of bandwidth requirements. Consequently, a selected CPE may receive unsolicited modifications to the bandwidth granted on a frame-by-frame basis. If the selected CPE user is allocated less bandwidth for a frame than is necessary to transmit all waiting data, the CPE may use the QoS and fairness algorithms to service its queues. The CPE user may "steal" bandwidth from lower QoS connections to piggyback requests for more bandwidth using the piggybacking technique described above.

FIG. 13 shows connection from the representative LL-MAA MAC sublayer 1350 to the HLL-MAA MAC sublayer 1360, which may for example reassign physical channels to share loads. It should be understood that a given CPE may well be connected to a particular base station by two or more physical channels, permitting such load sharing between physical channels. In this event, CPE 1310 may have duplicates (not shown) of the queues 1314 and the LL-MAA MAC 1316. Similarly, while the MACs 1326 and 1336 are LL-MAA MACs shown managing the connection of a single physical channel, duplicate LL-MAA MACs and queues may be needed for each physical channel handled by the CPEs 1320 and 1330.

QoS Specific Fairness Algorithms

Data for transmission on the uplink and the downlink is may be queued by quality of service (QoS) designations, and the data transmitted in order of a QoS queue priority as described above. As the queued data is transmitted, there may be a QoS queue for which there is insufficient bandwidth to transmit all queued data during the current TDD frame. When this situation occurs, a QoS specific fairness algorithm is initiated to ensure fair handling of the data queued at that QoS. There are 3 basic fairness algorithms that can be implemented: (1) Continuous Grant; (2) Fair-weighted queuing; and (3) Round Robin.

The MAC need not police connections for bandwidth usage. Policing may be performed by higher control layers. The MAC then assumes that all pending data has met contractual restrictions and can be transmitted. Continuous Grant queues have the simplest fairness algorithm. All data in these queues must be sent every TDD frame. Insufficient bandwidth indicates an error in provisioning.

Fair Weighted Queuing

Fair weighted queuing requires that all connections at a given QoS have a weight assigned to them to determine the percentage of the available bandwidth they are eligible to receive. This weight value may be derived, for example, from one or more data rate parameters, depending upon the contractual parameters of the provisioned connection. Three such parameters are: (1) Data Pending; (2) Guaranteed Rate; and (3) Average Rate.

Real-time VBR connections are established as DAMA connections with fair-weighted queuing based upon data pending. For a QoS queue of this type in a TDD frame having insufficient bandwidth to transmit all of the data in the queue, a weight for each connection in the queue is determined. In one embodiment, this weight is the amount of data pending for the connection expressed as a percentage of the total data pending in the queue. Because the amount of data pending is dynamic, the weights for these types of queues must be determined every TDD frame where there is insufficient bandwidth to send all data in the affected queue.

For DAMA connections contracted at a guaranteed rate the weights are calculated based on the guaranteed rate. In this case, the weight may be expressed as a percentage of the total guaranteed rate of all connections with data pending in the queue. Because the guaranteed rate is provisioned the weights need not be determined each TDD frame where they are used. Rather, the weights for a queue are only determined when there is a provisioning change (i.e., a new connection, a change in connection parameters, or a connection termination) for one of the connections in the queue.

For DAMA connections contracted at an average rate, the weights may be calculated based on the average rate. The weight is the average rate expressed as a percentage of the total average rate of all connections with data pending in the queue. Because the average rate is provisioned the weights need not be determined each TDD frame where they are used. Rather, the weights for a queue are only recalculated when there is a provisioning change for one of the connections in the queue.

In all of the cases described above, the granularity of the bandwidth allocations may be too coarse to provide a perfect percentage-based weighted allocation across the connections in the queue. This may result in some queues not receiving any bandwidth in a particular TDD frame. To ensure that the occurrence of this condition is fairly distributed across the connections in the queue, the connection that did not receive bandwidth is given priority the next time the insufficient bandwidth condition exists for the queue. For queues with weights based upon guaranteed or average rates some connections may not have sufficient data pending to use all of the bandwidth that they are entitled to based upon their calculated weight. In these cases, the connection's unused bandwidth is fairly distributed across the connections having excess data pending.

Some QoSs require that data be aged. For queues at these QoSs there is an associated queue of one step higher priority. If data is not transmitted by the provisioned aging parameter, the data is moved to the higher QoS queue and given priority over newer data in the original queue regardless of the relative weights of the connections.

Round Robin

The Round Robin fairness algorithm is used for best effort connections where all connections have equal weight. When insufficient bandwidth exists to transmit all data in the queue in a particular TDD frame connections are allocated bandwidth in a round-robin fashion with each connection receiving a block of bandwidth up to a queue-specific maximum. Connections that did not receive bandwidth are given priority the next time the insufficient bandwidth condition exists.

Utilizing Allocated Bandwidth

Once a CPE is allocated bandwidth by the base station, the CPE, not the base station, is typically responsible for using the uplink bandwidth in a manner that can accommodate the services provided by the CPE. The CPE is then free to use the uplink bandwidth that was allocated to it in a manner that is different than originally requested or granted by the base station. For example, the service requirements presented to a selected CPE can change after the selected CPE requests bandwidth from its associated base station. The CPE advantageously determines which services to give bandwidth to and which services must wait for subsequent bandwidth requests. To this end, the CPE maintains a priority list of services. Those services having higher priority (e.g., those services having high quality of service demands) will be allocated bandwidth before those services having lower priority (e.g., IP-type data services). If the CPE does not have sufficient bandwidth to meet its service requirements, the CPE will request additional bandwidth allocations by either setting its poll-me bit or by piggybacking a bandwidth allocation request.

One advantage of having the CPE determine how to distribute its allocated bandwidth is that it relieves the base station from performing this task. In addition, the communication overhead that is required by having the base station instruct the CPE how to distribute its allocated bandwidth is thereby eliminated, thus increasing usable system bandwidth. In addition, the CPE is in a much better position to respond to the varying uplink bandwidth allocation needs of high QoS data services. Therefore, the CPE can better accommodate the needs of these types of service requirements than can the base station.

However, the CPE is not the only "user" which may be recognized by the base station for bandwidth request and allocation purposes. Individual connections, or groups of individual connections, may form discrete user entities. In that case, the CPE may not be given flexibility for allocating bandwidth, but rather may be required to provide bandwidth for either data, or for bandwidth request, to specific user entities which communicate via the CPE. Such requirement may readily be communicated to the CPE via the connection identifier included with the provided bandwidth; for example, a connection may be identified as a discrete user or a member of a discrete user group as part of the connection setup process during the initiation of the connection. When such sub-CPE users are established, it may be advantageous to have the CPE consolidate bandwidth requests between different ones of its users into single packets.

Adaptively Providing Bandwidth Request Opportunities

In order to be able to quickly respond to communication needs, it is useful to provide every user with frequent opportunities to request bandwidth. As described previously, each of the various techniques for obtaining bandwidth requests are relatively more efficient under some circumstances. For example, multicast polling may cause bandwidth to be wasted to resolve collisions. However, when CPE users are inactive for substantial periods, the frequency of their requests is low and the probability of collision with other similarly inactive CPEs becomes small. In this case "contention" polling, which uses very little bandwidth in the absence of collisions, can efficiently provide frequent opportunities for users of inactive CPEs to request bandwidth. "Inactive" users may be divided into as many groups as bandwidth units are available, and one contention slot may then be assigned to each such group. In order to accommodate such varying contention polling groups, it may be helpful to define many small polling groups including each new user, so that a convenient polling group address is available when needed.

As the number of CPEs designated in each multicast poll decreases, the likelihood that a particular CPE within the polling group will request bandwidth may be allowed to increase. Thus, relatively more active CPEs (e.g. those which have had activity more recently, or which have connections expected to generate a bandwidth request soon) may be serviced by a multicast poll to a multicast poll group having only two or three CPEs, without increasing the probability of a collision. In this way, the connection parameters of individual users, for example the bandwidth request probability of a CPE, can be used to adjust the membership of polling groups which are each serviced by multicast polling at a particular rate, and also to adjust the polling rate of such multicast polling. A higher rate of multicast polling decreases the likelihood of collision and permits quicker response to a CPE's need for bandwidth. Conversely, of course, as the amount of available bandwidth for multicast polling decreases, it may be necessary to provide a contention slot to a larger multicast polling group of "inactive" users. In this case, the definition of "inactive" may be made more stringent in order to reduce the likelihood of a collision, so that only users with a low probability of making a bandwidth request are included in a multicast polling group having a large number of members.

It is often efficient to poll active CPEs at a zero polling rate, absent a request indicated by a "poll-me" message, because active CPEs have opportunities to engage in "piggybacking" techniques or to send "poll-me" messages, as described above. Between the extremes of high usage which permits zero-rate polling, and low usage which can be efficiently serviced with multicast polling, moderate usage CPEs (or other users) may be given individual or reservation-based polling to provide opportunities to request bandwidth without collisions.

For users (or groups of users) which are selected for individual polling, the rate of polling for each user may be affected by a combination of one or more objective parameters specific to the user's communications, and may also be affected by objective parameters reflecting the shared medium generally, such as constraints on the shared physical channel. Examples of communication parameters corresponding to a particular user (or group of users) include: a) time since last bandwidth usage; b1) user QoS, or b2) for groups, number of high-QoS connections or composite QoS; c) expected rate of bandwidth usage; d) measured rate of previous bandwidth usage; e) contractual guarantee of bandwidth availability and response time; and f) modulation level of physical channel, to name a few. Examples of parameters which reflect the shared medium more generally include: i) availability of bandwidth for the CPEs, i.e. available time in the uplink subframe; j) availability of high-QoS bandwidth, including low-QoS bandwidth which can be reallocated; k) a number of users for which individual polling is desired; l) number of users at each modulation which do not presently have allocated bandwidth, i.e. are paused or inactive; m) the average time, for groups of users, since using bandwidth; n) and other composites of parameters for groups of users in various categories.

The number of parameters general to the shared medium which can affect rates of individual polling is practically unlimited. It may be useful to categorize some of these parameters into a finite number of possible states, and use only the categorized state values in determining polling rates. Useful categorization may be better understood by examples. The following example is provided to illustrate a way to categorize communication parameters, and not to limit the scope of the claimed invention.

As one example, users may be categorized according to relative recent activity, with activity category I="active," category II="no activity for one to ten frames," category III="no activity for eleven to one hundred frames," category IV="no activity for one hundred and one to one thousand frames," and category V "no activity for over one thousand frames." In a simple example, all category II users may be individually polled at least once every three frames; if bandwidth is available, category III users are polled next, up to a maximum of once per five frames. Users in category IV may be grouped according to modulation level to form groups of three or fewer members, and each group may be multicast polled at least once each five frames. All category V users may receive a single multicast poll at least every five frames.

Figure 14:
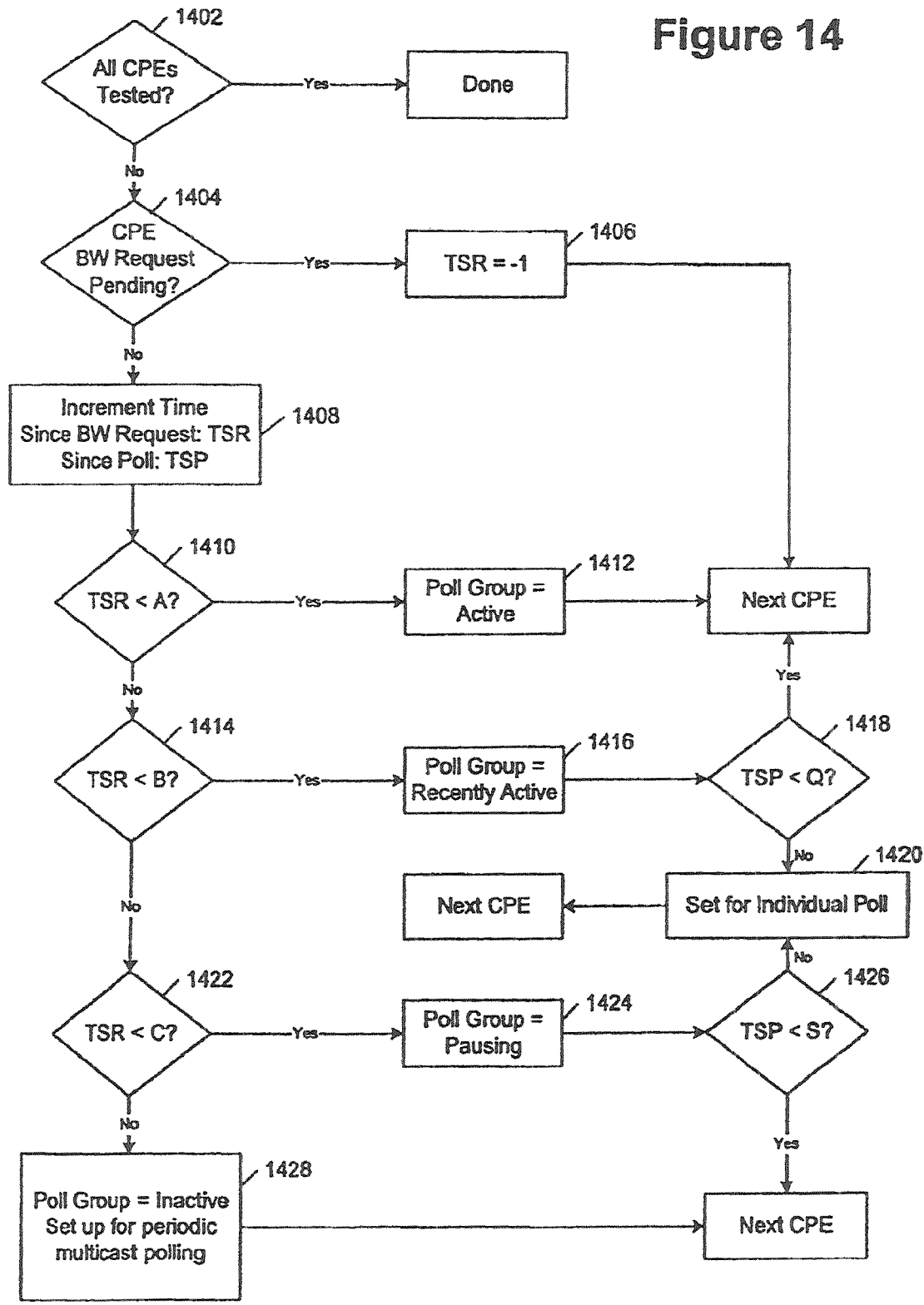
FIG. 14 is a flowchart for an adaptive polling group assignment method or system.

FIG. 14 is a flow diagram showing method steps which may be employed by a base station to enhance the efficiency of obtaining requests for bandwidth allocations by adaptively applying more appropriate bandwidth allocation techniques as the conditions, particularly recent usage and QoS requirements, of CPEs changes. These method steps may be performed by a polling policy module of the system processing communications at a base station. Polling decisions are updated periodically; the decision tree may be entered once per frame or once per two frames, or even less frequently. Note that while four polling groups (Active, Recently Active, Pausing and Inactive), as described below with respect to FIG. 14, is convenient and effective for some systems, either more or less polling groups may be defined along the general lines of the foregoing description.

Entering the method described in FIG. 14 at STEP 1402, the base station checks the polling status of each CPE, and when none remain to be checked, the procedure is done. Otherwise, at STEP 1404 a check is made for outstanding bandwidth requests, which when satisfied will permit a CPE to piggyback a bandwidth request, or request polling. If the CPE has an outstanding bandwidth request, then at STEP 1406 a timer TSR is set to −1; thereafter the next CPE will be checked. If there is no BW request outstanding, then at STEP 1408 two timers are incremented (or any other means for tracking time may be employed). The "time since request" timer TSR generally tracks how long the CPE has been inactive, while the "time since poll" timer TSP tracks the duration of the polling period.

At STEP 1410, a check is made whether it has been less than a short time A since the CPE was active, and if so then the CPE is deemed to be in the "active" polling group at STEP 1412, and the next CPE will then be checked. The value of A may for example be one, two, or a number less than 10 frame periods, at least for 1 ms frame period systems. If TSR is greater than A, then STEP 1414 determines if it is less than the larger quantity B. B may be a fraction of a second to several seconds, i.e. a few frames up to thousands of frame periods in the system described above. If TSR is less than B, the CPE is deemed "recently active" at STEP 1416 and then will be individually polled. For such recently active CPEs, the polling period may be fairly high. Thus, at STEP 1418 the time since last poll TSP is compared to threshold Q. Q may range from about 10 frames to hundreds of frames, depending in part upon the value assigned to A. If TSP has exceeded the Q period, then at STEP 1420 the CPE is set up for an individual poll, which includes setting TSP=−1, and otherwise the next CPE is checked.

If TSR was not less than B, then at STEP 1422 TSR is checked for being less than C. If TSR exceeds B but is less than C, then the CPE is deemed at STEP 1424 to be pausing, and that CPE will be polled at a period defined by S in STEP 1426. There, if TSP is less than S then a poll is not needed yet and the next CPE is tested at 1402; but if TSP is not less than S, then the CPE is set up for an individual poll at STEP 1420. If TSR was not less than C at STEP 1422, then at STEP 1428 the CPE is deemed Inactive, and is set up for periodic multicast polling as described above, including setting TSP=−1. The multicast polling will be performed at a rate defined elsewhere, for a plurality of different CPEs which are all deemed inactive. As an example, a multicast poll may be provided every 100 ms for each group of six or less Inactive CPEs. Groups for such multicast polls may usefully be selected according to the modulation level of the CPE, because by performing the polling at higher modulation levels (e.g. QAM-64), less time is consumed for a physical information unit for polling.

In the decision variables of FIG. 14, C is a greater value than B, and may be many seconds or even many minutes. Typical values for A, B and C may be 2 ms, 2 s, and 2 minutes, respectively, but as explained these values may vary widely according to the needs of the particular application. Typical values for Q and S may be 20 ms and 200 ms, respectively.

The values of each of the variables A, B, C, Q and S may be adaptively varied depending upon the currently available bandwidth (or currently used bandwidth), or to the number of members of the defined groups. For example, the value of C may be decreased proportionally to a decrease in available bandwidth, in order to cause CPEs to be more quickly deemed inactive, so that multicast polling may be used and bandwidth saved thereby. Meanwhile, Q may be increased proportional to the number of "Recently Active" users, while S may be increased proportional to the number of "Pausing" users. Conversely, C may be increased, and Q and S decreased, proportional to an increase in bandwidth available for polling. The skilled person will understand that a wide range of adaptive algorithms may be constructed depending upon the particular circumstances of an embodiment of the present invention.

At least two distinct types of quality of service (QoS) may be identified and employed as communication parameters corresponding to the user for adaptively modifying the techniques used for obtaining bandwidth requests. A first type of QoS is contractual, and represents the performance which the communication system provider undertakes to guarantee to particular users. The second type is required by the nature of the communication connections serviced to ensure integrity of the communication. For example, constant bit rate (CBR) services such as the well-known T1/E1, T2/E2, and T3/E3 lines each require bandwidth allocations which will enable the connection to convey data at regular time intervals, within preestablished restrictions on the jitter and delay of the time intervals, to ensure the integrity of the communication. These two different types of QoS may be included within the general term QoS, or may be distinctly specified, for example, as "contractual QoS" and "physical QoS." These QoS parameters may be used to determine the nature and rate of technique which is to be used to determine bandwidth for a particular user.

The precise mixture of the foregoing techniques which will permit the base station to most efficiently accept and respond to bandwidth requests within the constraints of the service negotiated will, of course, vary from system to system. The base station may adjust the "polling policy," or method by which bandwidth requests will be obtained, for each CPE individually based upon an algorithm which is adapted for the system. In an exemplary embodiment, however, a limited number of polling policies may be defined, and each CPE may be assigned to utilize one of the defined polling policies. The group of CPEs assigned to utilize a particular polling policy thus forms a "polling policy group."

Per-User Adaptation of Bandwidth Request Techniques

As explained above, users may be adaptively assigned to different "polling policy" groups or categories, and the technique for obtaining bandwidth for a particular user may be determined by the group or category to which they are assigned. However, the technique for obtaining bandwidth requests may be adaptively determined for each particular user on the basis of the users parameters (and relevant channel parameters) without reference to such "polling policy" groups. Such "per-user" adaptation is described below.

Figure 15:
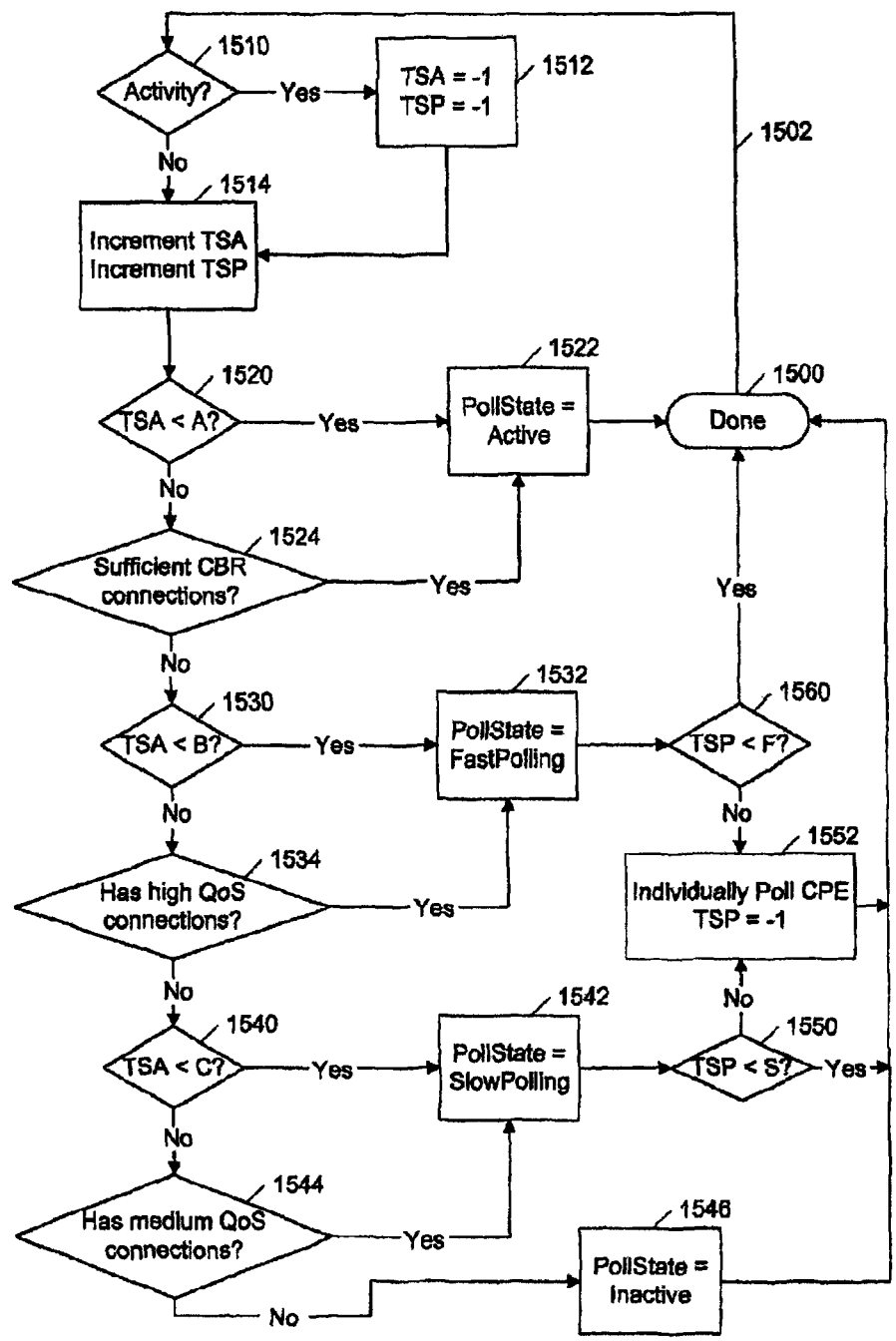
FIG. 15 is a flowchart for adaptively obtaining bandwidth requests for each user.

FIG. 15 is a flow diagram showing transitions in a polling state for individual CPEs, which respond, for example, to the activity and QoS of connections to each CPE, in order to adaptively vary the procedure by which bandwidth requests are obtained from each CPE. The state tests may be performed for each CPE periodically, such as every frame. The state tests may be initiated by leaving the "Done" state 1500 along path

1502. At 1510 a test may be performed for activity in the most recent frame. If there has been activity, then the CPE has had an opportunity to request BW or at least request to be polled. Therefore, time since activity (TSA) and time since poll (TSP) are both set to −1 at block 1512. Thereafter, TSA and TSP are incremented at block 1514. Next, a test is made at block 1520 to see if activity is recent enough, i.e. if TSA is less than a first threshold "A." If less than "A" periods have elapsed since activity, then the CPE may be categorized as "Active" at block 1522. In many instances it will be unnecessary to poll active connections, since they have adequate opportunities to request bandwidth, and accordingly Active CPEs may immediately proceed to Done at 1500. If TSA is not less than "A," then at 1524 a test may be made as to whether there are adequate constant bit rate (CBR) connections. Sufficient CBR connections exist when the CPE has a CBR connection of a sufficient rate to allow the CPE to set a PollMe bit often enough to cause polling at a rate at least as fast as the selected FastPolling rate. In this embodiment, the presence of sufficient CBR connections means that there are sufficient uplink connections; moreover, the base station provides uplink bandwidth to the user at the CBR rate. Accordingly, even though the CBR rate may be such that more time has elapsed since the last activity than "A," it is preestablished that uplink bandwidth will be provided soon enough and frequently enough to provide opportunities for bandwidth requests which are sufficient to meet the QoS requirements of the link. Thus, sufficient CBR activity will have a similar effect as actual activity, such that the poll state for such a CPE may also be set to Active, and the flow may proceed to block 1500.

If the CPE is neither presently active, nor has enough CBR connections, then TSA may be tested again at block 1530 to see if TSA remains below another threshold, B (B should be greater than A). If so, then at block 1532 the poll state of the CPE may be set to Fast Individual Polling. If TSA is not less than B, the processing proceeds to block 1532 to test for high QoS connections. The CPE poll state may also arrive at the Fast Polling block 1532 via the decision 1534, if it has one or more high QoS connections. Thus, the presence of one or more high QoS connections to the user may prevent the user's polling state from reaching the slow polling state 1542. If the CPE poll state is set to fast polling, then at block 1560 the time since polling (TSP) of the CPE will be tested to see if it is less than a threshold "F." If it is, then the CPE has been polled recently enough and the processing is done for that CPE and frame. Processing proceeds to block 1500, which will generally be left only after the next frame is completed. If TSP is not less than F, then a flag may be set or other arrangement made so that the CPE will be polled, as directed by block 1552. Once instructions for such poll are in place, the CPE is done for that frame.

If at block 1534 the CPE does not have high QoS connections, then it may be tested to see if its TSA is still less than a threshold "C" (C should be greater than B). If so, then the CPE's poll state may be updated at block 1542. If not, the CPE will be tested at block 1544 to see if it has medium QoS connections, which would provide another reason to have its polling state set to Slow Polling at block 1542. After the CPE's poll state has been set to a slow polling state at block 1542, the CPE's TSP is tested at block 1550 to see if it is less than a threshold S. If so, then processing is done for that CPE for the present frame, and if not then processing advances to block 1552 where arrangements are made so that a poll will be promptly provided to that CPE, before the processing proceeds to block 1500 "done." Meanwhile, if the processing proceeded to block 1544 but the CPE did not have medium QoS connections, then the CPE's poll state may be set at block 1546. Block 1546 indicates that the CPE's poll state may set to "Inactive," at which point, for example, individual polling may be suspended for the CPE, at least until further activity occurs. The CPE may be set for only multicast polling, in which it must contend for uplink polling bandwidth provided to a plurality of such users, or even to all users which do not have other opportunity to request bandwidth (broadcast polling). Instead of proceeding directly to a final poll state 1546 after failing the test block 1544, the steps of FIG. 15 may be extended in a similar fashion as blocks 1530, 1534, etc., testing for even longer inactivity at each such extended step. Thus, block 1546 could effectively be broken into two or more blocks, one instructing periodic multicast polling and another terminating all polling so that only the global contention slot remains available to the particular CPE for requesting bandwidth. Other similar variations are also possible. At the end of such poll state testing, the processing for the particular CPE proceeds to block 1500 to wait for the next test cycle, which is typically provided during the next frame, but may also be delayed by an intervening frame.

In another per-user bandwidth request technique embodiment, a calculation is performed for each user periodically, such as once per frame, to determine whether or not to poll the user immediately. Polling is thus adjusted for each user to achieve a minimum threshold of QoS required by the user, and to provide increases in the polling rate in the event of uplink bandwidth availability, limited by any needs for a consistent polling rate, or low jitter. It is convenient to determine whether to poll in the present frame, since inputs to the system are constantly changing, for example as connections are added, dropped, or changed. An exemplary Boolean function to be evaluated in this embodiment is structured as follows:

$$\text{ShouldPoll} = f(Tg, \text{minQos}, \text{maxQos}, U1)$$

In the above equation, "Tg" is the time (which may be quantified in units uniquely appropriate for the system, such as frames) since the user was last granted bandwidth. "MinQos" is the minimum required QoS of the user, expressed as a request frequency, or request opportunities per second, and is a function of the maximum delay which the connection or connections of the user can tolerate: minQos=f1(max delay), where "max delay" is the maximum delay which can be tolerated by the user (and which is typically determined by the least of the maximum delay tolerances for each active connection of the user). MaxDelay may be expressed in units of frames, in which case minQos may be determined, for example, as minQos=Framerate(in frames/s)/maxDelay. MaxDelay may also be measured in (standard) time units, an example of which has minQos=1/maxDelay(in seconds). Thus, in a system with 1 millisecond frames (a framerate of 1000/second), a connection that could tolerate a delay of 100 milliseconds (=100 frames) would have minQos=Framerate/maxDelay=(1000 frames/s)/(100 frames)=10 (request opportunities) per second. Similarly, if maxDelay is in time units, then minQos=1/maxDelay=1/(100 mS)=10 (request opportunities) per second. MinQos may, for example, be determined by the least delay-tolerant connection of a user, or may be determined by the composite delay tolerances of all active users, and thus will generally change when connections are set up, terminated or changed.

"MaxQos" is the maximum allowed QoS of the user, also expressed as bandwidth request opportunities per second. In a simple example, maxQos=f2(minQos, Framerate), or more specifically, maxQos=greater of [(Framerate) and (minQos)]. Thus, maxQos may be truncated at a rate equal to the frame rate of the system. However, maxQos may be permitted to exceed the frame rate by permitting plural request opportunities for a single user within a frame. Such plural bandwidth request opportunities in a frame may be employed by a user to send data as well as an explicit bandwidth request in the uplink, despite not having requested bandwidth allocation in the previous frame. "Framerate" is a generally fixed value defined by the system, though variable frame rate systems are also possible. MaxQos, like minQos, will generally be calculated only upon a change in connection status. "U1" is the current uplink utilization of the link shared by the user, and may be expressed as a percent (e.g., 80 indicates that the link is currently 80% full). This value will change frequently.

In the following exemplary equation, the bracketed item returns a "1" if true, "0" if false:

$$ShouldPoll=[Tg>=(Framerate/(minQos-(maxQoS-minQoS)*(100-U1)/100))]$$

In the simplest case, if ShouldPoll is true, then the user for which ShouldPoll has been calculated will be immediately polled (e.g., by providing a unit of uplink bandwidth to the user in the next uplink map). Evaluating the above equation each frame for a user yields a polling determination for such user on a substantially continuous basis, based upon characteristics of the user (e.g., minQos, maxQos, and Tg) and upon characteristics of the link shared by the user (e.g., Framerate, U1). The basis of the exemplary "ShouldPoll" equation, is substantially, but not absolutely, continuous. Its absolute continuity is limited by system quantization due, for example, to the integral nature of frame units which limit the continuity of expressed frequencies (frames per second) and of time (when it is expressed in frame periods between events). An equation based upon a combination of one or more variables which are allowed to take on all applicable values, limited only by the applicable range and quantization level of the variables, has a substantially continuous basis. An equation which combines one or more variables to form a compound variable which can take on a large number (generally, more than a dozen) of possible values also has a substantially continuous basis. Note that when implementing functions such as the exemplary equations above, it may be convenient to modify the equations to use values inverse to QoS (which is typically in units of request opportunities per second). For example, one may use minPollPeriod=1/maxQos, and maxPollPeriod=1/minQos. Since minPollPeriod and maxPollPeriod are inverse to QoS frequency values, they may be expressed as time, for example in units of frame periods. Based upon the foregoing explanation and examples, the skilled person can readily derive alternative continuous functions based upon the particular needs of the system with which they are working.

The preceding examples explicitly teach per-user adaptation, as distinct from "group-based" adaptive techniques for obtaining bandwidth requests. However, group-based and per-user techniques are not mutually exclusive, and practical systems will often employ aspects of both group-based and per-user adaptation techniques. In a single exemplary system, some users may be polled based upon substantially continuous functions of parameters uniquely associated with them (with or without other parameters common to the channel), while other users are polled according to a rate established for a group, or polling category, of which they are a member. For example, users falling within one arbitrary range of activity may be designated for group polling, while users within another arbitrary range of activity are designated for zero polling; yet users falling outside those two ranges may be polled on the basis of a substantially continuous function of relevant parameters. All logically consistent combinations of group-based and per-user techniques such as taught herein are embodiments which may be appropriate for some systems, and may be selected for a particular system based upon engineering considerations of performance and convenience.

Users, Groups and Categories

The foregoing principles teach obtaining bandwidth requests from users adaptively based upon parameters of the users, or upon composite parameters of a group of users. The users, and groups and categories of users, which exist in different embodiments may vary substantially in character. In general, a user is an identifiable entity communicating via a base station and having at least one communication parameter (relevant to obtaining uplink bandwidth) which reflects the user's communication via the base station. The user is treated as a discrete entity for purposes of obtaining BW, and is granted BW as a unit. Users can be an individual connection, a plurality of logically grouped connections, or physically grouped connections. All of the connections served by a particular CPE, and logical subgroups of connections within a CPE, are examples of grouped connections forming a user which is treated as a single entity for BW allocation purposes. Subgroup users within a CPE may be based on common conditions, such as common QoS, or may be organized as a "user" based on load-sharing principles.

Above, a group of distinguishable entities is described as being treatable as a discrete user for purposes of bandwidth requests and allocation. However, a group of such discrete users may be treated in common in some regard. For example, one group of CPE users might be defined by the fact that they communicate by a common shared channel (common frequency and transmitter), have common modulation and forward error correction (FEC) settings, and further have low recent BW usage. Such a group of CPEs can, for example, be given the same multicast polling opportunities. However, this is a group of discrete users, and thus each user may request BW, and have BW allocated, on an individual basis. Membership in such a group is, in general, variable depending upon relevant conditions.

A plurality of users may be defined as belonging to a category of users, such as those users sharing the same physical connection channel and having a particular QoS, or those users sharing the same physical connection, modulation level and FEC technique. Decisions regarding BW allocation may be based in part upon one or more such categories to which a particular user may belong.

Communication parameters may also be categorized, which is to say that a range of a particular parameter may be treated the same for some purpose. For example; users may be identified as belonging to a particular category of users which share the same physical connection channel and also have a particular category of recent BW usage. Thus, users sharing the same physical channel may be identified as belonging to a "low usage," a "recently active," or an "active usage" category in regard to the value of this parameter which is applied to them. In this way, a parameter such as "time since BW last allocated" may be treated as having a finite of possible states, as an alternative to being treated as a practically continuous variable parameter.

These possibilities, for BW request and allocation purposes, of designating a group of identifiable entities as a single user, of designating a category of users for common treatment in some respect, and of responding to communication parameter value either as a member of a category of such values, or as a continuously variable parameter, add a large measure of flexibility to the inventive BW request and allocation techniques taught herein. Each claim must be interpreted, insofar as possible, as referring to all such alternative interpretations. Moreover, the foregoing examples may provide some specific meanings for the terms "user," "group" and "category," but all such specific meanings are in addition to the usual dictionary meaning of the terms, rather than limitations on the dictionary meanings.

Adaptive Bandwidth Request Technique Modules

A system using the above bandwidth request processing techniques may implement them within a series of functional modules. For example, the information flow diagram of FIG. 16 reflects a system having a polling policy module 1610, an individual poll module 1620, a bandwidth request processing module 1630, a "poll-me" message processing module 1640, a multicast poll module 1650 and associated contention resolution module 1660, and a channel bandwidth allocation module 1670. These may be functional subsections of an overall base station LL-MAA MAC 1690 for controlling access to one physical channel.

The polling policy module 1610 may be a functional block within a base station LL-MAA MAC handling a particular channel. The polling policy module will be configured to adaptively control the technique by which bandwidth requests will be obtained from each user. The configuration may employ any combination of the adaptive techniques described above, for example as shown in FIGS. 14 and 15, and in particular may employ any combination of polling group-based and per-user calculations to change the technique or rate at which opportunities for soliciting bandwidth are provided to each particular user. Thus, for example, the polling policy module may establish zero polling for currently active users, may assign users having a range of usage history and QoS needs and guarantees to one or more polling groups to which multicast polls are made on a bandwidth-available basis, and may individually poll users at a periodic rate depending substantially on per-user communication parameters, such as recent bandwidth usage, physical connection QoS, number of active connections (for users which are groups or CPEs), and contractual QoS. In the less complex organization, as shown, the uplink subframe map queues, the "poll-me" message processing module, and the bandwidth request processing module each provide inputs to the polling policy module. Other inputs (not shown) are provided from higher levels of the system to indicate contractual QoS, user groups and connection IDs. However, more complex structures may include other data interactions, such as direct interactions between the polling policy module and the channel bandwidth allocation module, to permit balancing between these independently adaptive systems before the channel bandwidth allocation module directs the allocation in the uplink subframe map queues. The polling policy module may be a functional block of the base station LL-MAA MAC. It may be implemented at least partly in software, but the skilled person will understand that engineering considerations may indicate an advantage of having some or all of the functions of this module performed in hardware, such as in one or more ASICs.

The individual poll module 1620 may be configured to prepare for individual poll of one or more target users, and to queue such a poll for the next available downlink to the CPE handling (or identical to) each user. The individual poll module may accept instructions from the polling policy module defining which users to individually poll, and a rate or a priority for such polling, and may provide detailed polling bandwidth instructions to the channel bandwidth allocation module 1670. This module may also accept poll instructions from the "poll-me" message processing module 1640. The individual poll module may be a functional block within a base station LL-MAA 1690 handling a particular communication channel, and may be implemented in hardware, in software, or more typically in a combination of both, based upon engineering considerations such as the structure of associated modules.

The bandwidth request processing module 1630 may be configured to identify bandwidth requests disposed in the uplink communications received from the CPEs, and to interpret such requests. The module 1630 generally receives data from the base station LL-MAA MAC uplink sub-frame map queues 1680 identifying polling slots, and particularly contention slots, in the uplink sub-frame map. This information may be compared with the demodulated data actually received on the uplink receive queue 1690. An analysis of the data received during contention slots may readily be devised by the skilled person, for the particular protocol of the system, to distinguish a probable collision from a valid bandwidth request, and also from an absence of any response. Information indicating a probable collision may be forwarded to a contention resolution module 1660, described below. The bandwidth request processing module 1630 may be a functional part of the base station LL-MAA MAC 1690, and like other modules of the base station LL-MAA MAC, may be implemented in any combination of software and hardware. The output from the bandwidth request processing module, requests for bandwidth, may be directed to the channel bandwidth allocation module 1670.

The "poll-me" message processing module 1640 may be configured to interpret the poll-me message (and similar messages, such as a priority poll-me message, if used) to cause an active CPE to be polled individually. The "poll-me bit" processing module receives as an input the data in which may contain a "poll-me" message, identifies that message, and appropriately requests polling bandwidth from the channel bandwidth allocation module 1670.

The multicast poll module 1650 may be configured to identify, for example by input from the polling policy module, which CPEs are eligible for multicast polling due to their relatively low probability of requesting bandwidth. The multicast poll module 1650 may examine the previously identified polling groups which have been assigned, and may balance individual request probability for each member in such groups with the group size to determine a preferred multicast polling rate for the group. The multicast polling bandwidth output from this module may be directed to the channel bandwidth allocation module 1670. This module may be implemented in any practical combination of hardware and software.

Since multicast polling provides a potential for contention, an associated contention resolution module 1660 may perform the steps described previously to resolve collisions. The contention resolution module 1660 may receive information from the bandwidth request processing module 1630 indicating probable collision and potentially involved users (e.g. those polled during the contention slot which did not receive a separate individual poll nor dispose a poll elsewhere in the received uplink queue). The contention resolution module 1660 may then select a contention resolution procedure depending upon the circumstances, and may indicate to the channel bandwidth allocation module 1670 when further individual, or multicast polls should be provided to members of the contending group.

The channel bandwidth allocation module 1670 may receive inputs from the bandwidth request processing module 1630, the individual poll module 1620, and the multicast poll module 1650, and then direct the disposition of each bandwidth slot to the base station LL-MAA MAC uplink sub-frame map queues 1680. The bandwidth request processing module may take into account the available bandwidth of the channel, and may implement fairness algorithms (described elsewhere) to balance the bandwidth requests and availability, thus providing adaptation in the granting of uplink bandwidth. Such grant adaptation interacts with the distinct function of adaptively obtaining bandwidth requests, since the amount of bandwidth granted affects the bandwidth available for polling, as well as affecting the communication parameters of each user. Accordingly, a variation not shown in FIG. 16 permits direct interaction between the channel bandwidth allocation module 1670 and the polling policy module 1610 to permit iterative solution of the polling policy and bandwidth allocation adaptations.

Figure 16:
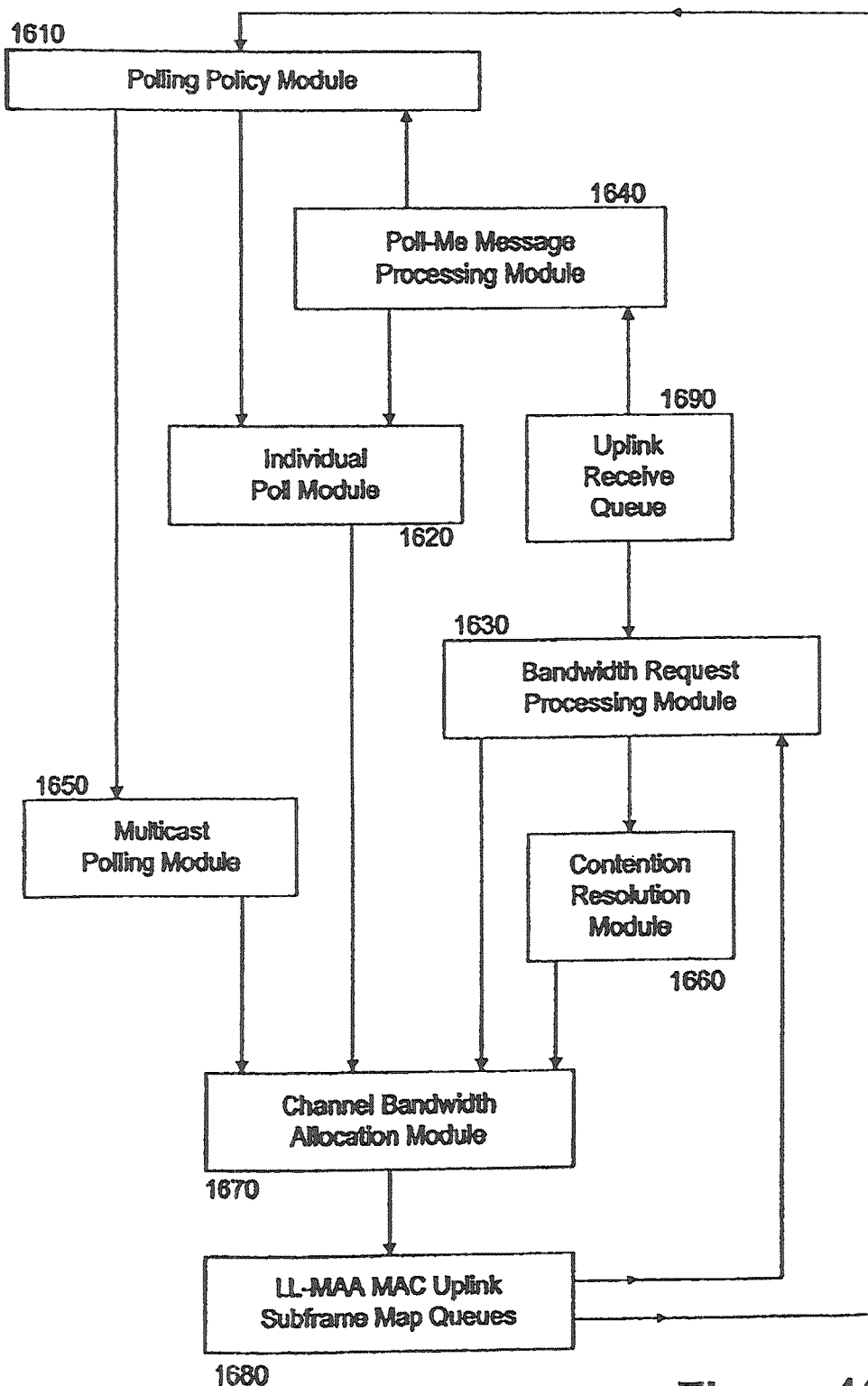
FIG. 16 is a chart of polling policy control information flow between system modules.

Each of the modules described above may perform its data manipulations in a processor under software or firmware control, or in hardware specifically prepared for the tasks, or in a combination of hardware and software. Moreover, those skilled in the art will understand that functions which are described as being performed by certain system modules may in general be performed by different modules. FIG. 16 show exemplary information flows, but many other information flows are possible in various embodiments of a system having a base station which adaptively obtains bandwidth requests from users.

SUMMARY

In summary, the bandwidth allocation method and apparatus described herein includes powerful, highly efficient means for allocating bandwidth in a broadband wireless communication system. The present bandwidth allocation method and apparatus uses a combination of individual and group polling techniques, contention-based polling, piggybacking, and CPE-initiated techniques to efficiently allocate bandwidth in a communication system. These may be employed with particular efficiency by dynamically and adaptively categorizing CPEs into polling groups, and using the bandwidth allocation techniques most appropriate for each such group. Advantageously, only those currently active CPEs (CPEs that currently have bandwidth allocations associated thereto) are permitted to request more bandwidth using either the piggybacking or poll-me bit methods. In addition, a base station can save bandwidth by implicitly informing the CPE of additional bandwidth allocation. The base station implicitly informs the CPE of additional bandwidth allocation by allocating additional bandwidth to the CPE in the uplink sub-frame map. Similarly, the base stations implicitly poll the CPEs by allocating bandwidth in the uplink to enable the CPEs to respond to the poll with a bandwidth request.

In honoring the bandwidth requests, the base station builds and maintains a logical queue of the data to be transmitted. The queues are developed by the base stations based upon the QoS. In addition, the base station allocates bandwidth based on a combination of QoS and a QoS unique fairness algorithm. The CPE itself, rather than the base station, distributes the allocated bandwidth to its services in any manner the CPE determines to be appropriate. Thus, the CPE can use its allocated bandwidth in a manner that differs from the originally intended (and requested) purpose.

A number of embodiments of the present invention have been described. Nevertheless, it will be understood that various modifications may be made without departing from the scope of the invention. Any DAMA system may efficiently obtain and react to varying bandwidth needs by employing the adaptive techniques described herein. The method and apparatus described herein can be used in many types of data communications systems, such as a satellite communication system. In such a communication system, satellites replace the base stations described above. In this case, the CPEs may not be at fixed distances from the satellites, making more difficult to schedule DAMA services for the CPEs. The methods described herein are not limited to wireless systems, but can be used in a wired communication system. The only difference between some wired systems and the wireless system described above is that the channel characteristics vary between the two. However, the bandwidth allocations do not change as between the two types of systems.

Other systems, both wired and wireless, may share media between a plurality of users without using frames as they are described herein. Even in such systems a scheduling interval for allocating opportunities to request bandwidth may be dynamically varied in accordance with the teaching herein in order to efficiently determine user bandwidth needs. Accordingly, it is to be understood that the scope of the invention is not to be limited by the specific illustrated embodiments, but only by the scope of the appended claims.

What is claimed is:

1. A system for obtaining uplink bandwidth requests from a wireless subscriber station in a wireless communication network, the system comprising:
   a polling policy module configured to select a communication parameter and to establish a polling protocol between the wireless subscriber station and the system over the wireless communication network based on the communication parameter;
   a polling module configured to directly poll the subscriber station from a base station in accordance with the polling protocol, to select a polling rate for the subscriber station based on the communication parameter and to poll the subscriber station at the selected polling rate for providing the subscriber station with bandwidth request opportunities;
   a receiver for receiving bandwidth requests from subscriber stations;
   a contention resolution module configured to provide a contention resolution mechanism for at least two subscriber stations which attempt to transmit a bandwidth request to the receiver of the base station within an uplink slot allocated to subscriber stations for bandwidth requests; and
   a channel bandwidth allocation module configured to allocate, in response to a per connection bandwidth request received from the subscriber station received by the receiver, a granted amount of uplink bandwidth for distribution by the subscriber station to one or more connections from a plurality of connections.

2. The system of claim 1, wherein the polling policy module is further configured to form a composite communication parameter for the subscriber station reflecting the first communication parameter and an additional communication parameter, and to change the polling protocol for the subscriber station in response to changes in the composite communication parameter.

3. The system of claim 1, wherein the communication parameter is common to the connections established at the subscriber station.

4. The system of claim 1, further comprising a multicast polling module configured to direct polls to a group of subscriber stations, for providing one or more subscriber stations in the group with bandwidth request opportunities.

5. The system of claim 1, wherein the channel bandwidth allocation module is further configured to poll subscriber stations by allocating unrequested uplink bandwidth to the subscriber stations as an opportunity to request further bandwidth.

6. A system as claimed in claim 1, further comprising a poll-me message processing module configured to identify a poll-me request received from a subscriber station with a current polling rate of zero and to instruct the polling module to individually poll the subscriber station using a polling rate established by the polling policy module for that subscriber station.

7. A system as claimed in claim 1, wherein the contention resolution mechanism is for use by subscriber stations with a polling rate of zero and which do not have unused uplink bandwidth for transmitting a bandwidth request.

8. A system for obtaining user uplink bandwidth requests in a communication station providing varying uplink bandwidths to a subscriber station, the system comprising:
a polling policy module configured to:
obtain values of a first selected communication parameter which varies over time for a particular user,
change a polling protocol for the user in response to a change in the value of the communication parameter,
obtain a value of an additional communication parameter, and
change the polling protocol for the user in response to changes in the additional communication parameter;
a receiver for receiving communications from users, including poll me requests;
a poll-me message processing module configured to identify a poll-me request in a packet received at a base station via the receiver, from a user that has a polling rate of zero and direct polling of that user in response to the poll-me request;
a polling control module configured to cause a base station to poll the particular user in accordance with the changed polling protocol and in accordance with directions from the poll-me message processing module to poll a user; and
a channel bandwidth allocation module configured to determine, in response to a bandwidth request received from the user, the amount of uplink bandwidth to be allocated to the user for distribution to a plurality of connections by the user.

9. A method of operating a base station for obtaining bandwidth requests from subscriber stations sharing a communication link to the base station, the method comprising:
classifying the subscriber stations based on a per customer premise equipment (CPE) communication parameter that varies over time;
enabling subscriber stations to request bandwidth using one of a plurality of bandwidth request techniques based on the communication parameter ; and
upon receipt of a bandwidth request, allocating bandwidth to the subscriber station for distribution to one or more of a plurality of connections by the subscriber station;
wherein the plurality of bandwidth request techniques include
a polling technique, wherein uplink bandwidth for bandwidth requests received at the base station is allocated periodically at a polling rate based on the communication parameter;
a piggyback technique, wherein bandwidth requests received at the base station are conveyed within unused bandwidth allocated to traffic;
a poll-me technique, wherein uplink bandwidth for bandwidth requests received at the base station is allocated in response to a poll-me message conveyed within the header of a data packet; and
a contention based technique whereby uplink bandwidth is allocated for bandwidth requests to all subscriber stations that do not use the polling, piggyback and poll-me techniques.

10. The method of claim 9, wherein the poll-me technique initiates polling of a particular subscriber station that has a polling rate of zero, on receipt of the poll-me message from the subscriber station.

11. The method of claim 10, wherein using the poll-me technique comprises:
identifying the poll-me message in a packet received from the subscriber station; and
polling the subscriber station in response to the poll-me message for providing one or more individual connection at the subscriber station with bandwidth request opportunities.

12. The method of claim 11, wherein a bandwidth request opportunity is an uplink bandwidth allocation provided for use by the subscriber station for requesting uplink bandwidth for a specified connection served by the subscriber station.

13. The method of claim 9, wherein the poll-me message uses one or more bits of data in a specified location within uplink bandwidth previously assigned to the subscriber station.

14. The method of claim 9, wherein the polling rate for a subscriber station serving a connection of a Constant Bit Rate type is set to zero.

15. The method of claim 9, wherein the contention technique comprises transmitting the bandwidth request for a subscriber station with a polling rate of zero in an uplink contention slot broadcast to all subscriber stations.

16. The method of claim 9, wherein the piggyback technique comprises embedding a request for additional bandwidth from a subscriber station with a polling rate of zero within bandwidth allocated to that subscriber station for uplink traffic, which bandwidth is not currently used for traffic.

17. The method of claim 9, wherein the polling rate for the subscriber station, is adjusted based on an updated value of the communication parameter when the subscriber station serves connections of burst type services.

18. The method of claim 9, where the communication parameter includes the quality of service required by the connections served by the subscriber station.

19. The method of claim 9, wherein the communication parameter is a quality of service parameter common to a group of connections.

20. The method of claim 9, further comprising:
assigning each subscriber station served by the base station to a polling category based on the communication parameter;
assigning a group polling rate to each polling category; and
polling the subscriber stations at the polling rate used for the respective polling category.

* * * * *